United States Patent [19]

Fujiwara et al.

[11] Patent Number: 5,451,195
[45] Date of Patent: Sep. 19, 1995

[54] TURRET PUNCH PRESS WITH A DIE EXCHANGING DEVICE

[75] Inventors: Takayuki Fujiwara, Kanagawa; Shigeru Ito, Tokyo, both of Japan

[73] Assignee: Amada Company, Limited, Kanagawa, Japan

[21] Appl. No.: 216,607

[22] Filed: Mar. 23, 1994

Related U.S. Application Data

[63] Continuation of Ser. No. 692,174, Apr. 26, 1991, Pat. No. 5,342,276.

[30] Foreign Application Priority Data

| | | | |
|---|---|---|---|
| May 1, 1990 | [JP] | Japan | 2-111799 |
| Jul. 13, 1990 | [JP] | Japan | 2-183986 |
| Aug. 3, 1990 | [JP] | Japan | 2-205233 |
| Aug. 9, 1990 | [JP] | Japan | 2-209118 |

[51] Int. Cl.⁶ ............................ B23Q 3/155
[52] U.S. Cl. ........................... 483/29; 72/446
[58] Field of Search ............. 483/28, 29; 72/405, 72/442, 446; 83/552, 563

[56] References Cited

U.S. PATENT DOCUMENTS

| | | | |
|---|---|---|---|
| 3,816,904 | 6/1974 | Herb | 483/29 |
| 4,103,414 | 8/1978 | Herb et al. | 483/28 |
| 4,165,669 | 8/1979 | Brown et al. | 83/552 |
| 4,423,546 | 1/1984 | Scott et al. | 483/29 |
| 4,437,224 | 3/1984 | Bredow et al. | 72/446 X |
| 4,521,950 | 6/1985 | Kase et al. | 408/35 X |
| 4,624,044 | 11/1986 | Bredow et al. | 482/28 X |
| 4,624,165 | 11/1986 | Bredow et al. | 83/685 |
| 4,649,622 | 3/1987 | Scott | 483/29 |
| 4,860,428 | 8/1989 | Brolund et al. | 483/29 |
| 4,951,375 | 8/1990 | Erlenmaier | 83/563 |
| 4,985,983 | 1/1991 | Otto et al. | 483/29 |
| 5,320,595 | 6/1994 | Hirata et al. | 438/29 |

FOREIGN PATENT DOCUMENTS

| | | |
|---|---|---|
| 0138122 | 4/1985 | European Pat. Off. . |
| 0143257 | 6/1985 | European Pat. Off. . |
| 2044183 | 3/1972 | Germany . |
| 2919551 | 11/1980 | Germany . |
| 3230051 | 3/1983 | Germany . |
| 332960 | 1/1985 | Germany . |
| 3507220 | 3/1986 | Germany . |
| 60-106630 | 6/1985 | Japan ............... 72/446 |
| 63-26225 | 2/1988 | Japan . |
| 1518062 | 10/1989 | U.S.S.R. ............. 483/29 |

*Primary Examiner*—Z. R. Bilinsky
*Attorney, Agent, or Firm*—Sandler, Greenblum & Bernstein

[57] ABSTRACT

A turret punch press and a die set exchange device for the press are disclosed. The punch press includes a turret carrying die sets in die set attaching areas, and a die set exchanging device having a plurality of housings on a carriage, which moves horizontally between the turret and a die storage section to take out and charge die sets with the turret and the die set storage section to exchange the die sets for the next use.

4 Claims, 22 Drawing Sheets

TURRET PUNCH PRESS WITH A DIE EXCHANGING DEVICE

This application is a continuation of application Ser. No. 07/692,174, filed Apr. 26, 1991, U.S. Pat. No. 5,342,276.

BACKGROUND OF THE INVENTION

1. Field of the Invention

The present invention relates to a die exchanging device for a punch press and to a turret punch press provided with such a die exchanging device.

2. Description of the Prior Art

In the prior art, a finite number of die sets are attached in a turret of a turret punch press, and the die sets are exchanged manually. Sometimes, an automatic die exchanging device is used to discharge die sets attached in the turret and to charge other die sets in the turret for next use.

The above mentioned conventional automatic die exchanging device includes a pair of arms; that is, a first arm for discharging die sets from the turret and a second arm for taking other die sets out from a die storage magazine.

Also, in the above mentioned conventional automatic die exchanging device the pair of arms only carry out discharging and taking out of a die set respectively from the turret and the die storage magazine at the same time and only exchanges the die sets. Therefore, it is necessary to exchange die sets several times when some die sets are required for one processing on a workpiece, and this takes much total time.

In addition, it is necessary to move the arms upwards and downwards since heights of the die storage magazine and a die set attached in the punch press for use differ from each other. Due to such movements of the arms, which is complicated, the die exchanging device requires large space and much time for exchanging of the die sets. Furthermore, the structure of the device becomes complicated for moving the arms, and, as a result, the exchanging device will cost much and take much time for possible repairing or maintaining.

Furthermore, in a conventional turret punch press with a die exchanging device, for example, a method for positioning and fixing a die set in the turret is generally used by pushing the die set to come into contact with a reference surface disposed on the turret and fixing it by means of a hydraulic pressing device.

In the above mentioned positioning and fixing method, the contact of the die set with the reference surface of the turret is surface-to-surface contact, and therefore it is difficult to cause the die set to come into uniform contact with the reference surface by reason of processing precision. Then, an error for positioning arises.

Furthermore, the hydraulic pressing device is disposed on the turret, arid therefore the punch press becomes complicated in structure and cost much, and it requires large space as a result. Moreover, time lag occurs, and maintenance becomes necessary for the use of hydraulic operation.

SUMMARY OF THE INVENTION

It is therefore a first object of the present invention to improve the above mentioned disadvantages and provide a turret punch press which can prepare a plurality of die sets for a turret of the punch press for a processing on a workpiece in advance, exchange the die sets into other die sets required for next use, and shorten time for exchanging the die sets.

It is a second object of the present invention to improve the above mentioned disadvantages and provide a turret punch press of simple structure wherein it is easy to position the die sets precisely in a turret of the punch press and is free of maintenance.

It is a third object of the present invention to improve the above mentioned disadvantages and provide a die exchanging device for a punch press, which moves horizontally between the punch press and a die set storage section of the press and exchanges die sets quickly.

To achieve the above mentioned first object, a turret punch press of a first embodiment of the present invention comprises: a turret having a plurality of die attaching areas in which die sets are to be supported in an attachable and removable manner; a die set storage section disposed close to the turret for storing a large number of die sets; and an automatic die exchanging device for exchanging die sets, wherein the automatic die exchanging device includes a plurality of die carrying sections which move between a die exchanging position of the turret and the die set storage section for exchanging the die sets.

The plurality of die carrying sections of the turret punch press of the first embodiment, for another example, are disposed in a horizontal and transverse row.

The turret punch press of the first embodiment, for another example, is characterized in that the number of the die carrying sections is greater by one than the number of the die set attaching areas.

The turret punch press of the first embodiment, for another example, is characterized in that the die set attaching areas at the die exchanging position are at the same height as the die carrying sections.

The turret punch press of the first embodiment, for another example, is characterized in that a large number of die sets stored in the die set storage section can be moved to positioned at the same height as the die exchanging position and the die carrying sections, and that the die carrying sections move horizontally in a transverse direction between the die exchange position and the die set storage section to exchange the die sets by discharging and charging the die sets in a horizontal direction with the die set attaching areas and the die set storage section.

To achieve the second object, a turret punch press of a second embodiment of the present invention comprises: a turret having die set attaching areas in which die sets are to be attached; a die exchanging device disposed outside the turret for exchanging the die sets attached in the die set attaching areas; and a device for fixing the die sets in the die set attaching areas and for releasing the fixing of the die sets, wherein only relatively light weight and simple structured small fixing elements of the fixing and fixing releasing device are mounted on the turret, and that other elements of the fixing and fixing releasing device for actuating the small fixing elements into a fixing or fixing releasing state are disposed outside the turret.

The turret punch press of the second embodiment for another example, is characterized in that the small fixing elements mainly include bars, pins, and springs, the springs forcing the bars and pins to engage the die sets to fix the die sets.

The turret punch press of the second embodiment, is characterized in that the die exchanging device and the fixing and fixing releasing device cooperate to exchange the die sets by discharging and charging the die sets in a horizontal direction with the die set attaching areas and to fix die sets in the die set attaching areas.

To achieve a third object, a die exchanging device of the present invention for a punch press includes at least one die set attaching area for attaching a die set in an attachable and removable manner and a die storage section for storing a large number of die sets, and further includes: a device for carrying time die sets horizontally at a height of the die set attaching area between the die set attaching area and the die storage section: and a device for discharging and charging the die sets horizontally in a same direction at the height with the die set attaching area and the die storage section.

As the turret punch press of the first embodiment is designed as mentioned above, it can carry and exchange a plurality of die sets at the same time and therefore shorten time for exchanging the die sets.

The turret punch press of the first embodiment which includes the die carrying sections of which number is greater by one than the number of die attaching areas in a rotatable turret can carry and exchange all time die sets in the turret at the same time and therefore shorten time for exchanging all the die sets.

As the turret punch press of time second embodiment is designed as mentioned above, the small fixing elements fix the die sets precisely in time die attaching areas, and the turret punch press is simple in structure and free from maintenance.

As time die exchanging device of time present invention is designed as mentioned above, the exchanging device can move quickly only in a horizontal plane between the press and the die set storage section.

DESCRIPTION OF THE PREFERRED EMBODIMENTS

Embodiments of the present invention will now be described in detail with reference to attached drawings.

In FIGS. 1-7, a turret punch press of the first embodiment of the present invention is described.

Figure 1:
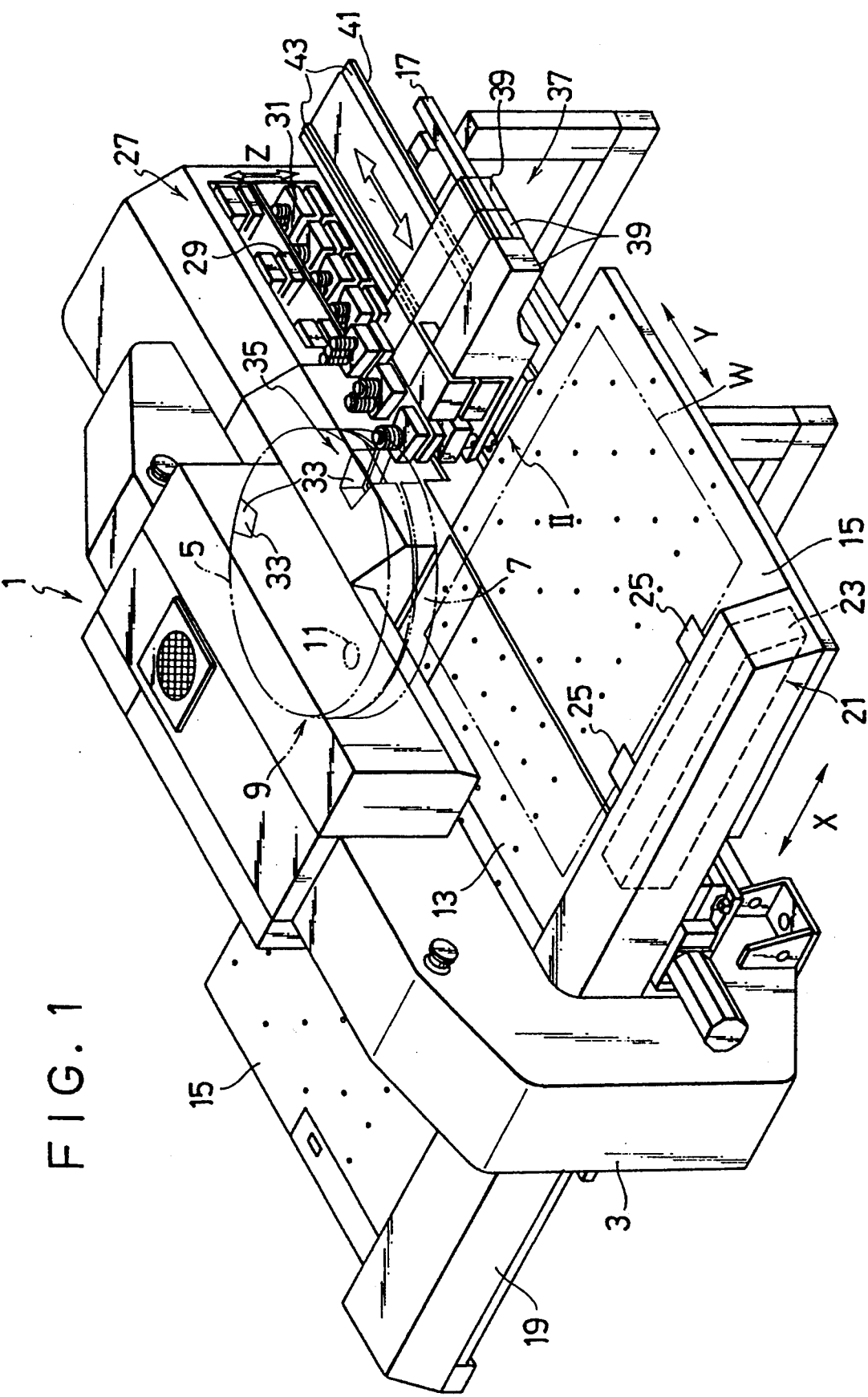
FIG. 1 is a perspective drawing of an example of a turret punch press of the present invention.

In FIG. 1, a turret punch press 1 is provided with a portal frame 3 in which at a central part a turret 9 includes an upper portion 5 and a lower portion 7 is supported by the frame 3. A plurality of punches P and dies D are attached in the upper portion 5 and the lower portion 7 of the turret 9 respectively at their circumferential parts.

A processing location 11 is disposed in the turret punch press 1. After the turret 9 is rotated so that a die set 29 on the turret 9 is positioned at the processing location 11, a punching process starts on a workpiece W which has been positioned at the processing location 11. The punching is carried out by means of a punch P and a die D. The punch P is pressed by a striker (not shown) which is disposed above the processing location 11 and is actuated by driving means (not shown) disposed on the frame 3.

The punch press 1 has a fixed center table 13 under the portal frame 3 and movable tables 15 provided beside the fixed center table 13. The movable tables 15 are guided by guides 17 which extend in a direction Y and are moved smoothly along the guides 17. At the left ends of the movable tables 15 a carriage base 19 extended in a direction X and provided with a positioning device 21 for positioning a workpiece W on the tables 13, 15 is attached. The carriage base 19 is provided with a carriage 23 which is movable in the direction X and to which a plurality of clamps 25 are attached for holding the workpiece W.

Therefore, the workpiece W held by the clamps 25 is moved in the directions X and Y when the movable tables 15 are moved in the direction Y and the carriage 23 is moved in the direction X, and then the workpiece W is subject to a punching process at the processing location 11.

In the turret punch press 1, the turret 9 is located on the center, the workpiece positioning device 21 on the left side, and a die set storage area 27 in the portal frame 3 on time right side which is opposite to the workpiece positioning device 21. The die set storage area 27 includes a die set storage section 31 in which a large number of die sets 29 each including an upper die having an appropriate number of punches and a lower die, are stored being spaced from each other in the directions Y and Z. The die sets 29 can be moved in the die set storage section 31 at least in the direction Z by conventionally known means.

On the circumferential part of the turret 9, a plurality of die set attaching areas 33 are formed in almost U-shaped cuts for attaching die sets 29 and are spaced from each other appropriately. The turret 9 can be rotated, and each die set attaching area 33 can be positioned at a die exchanging position 35.

In front of the die exchanging position 35 and the die set storage section 31, an automatic die exchange device 37 is disposed, which is movable in the X and Y directions and is provided with a plurality of housings 39 or die carrying sections. The number of the die carrying sections or housings 39 is greater by one than the number of the die attaching areas 33 of the turret 9 in FIG. 1.

Figure 2:
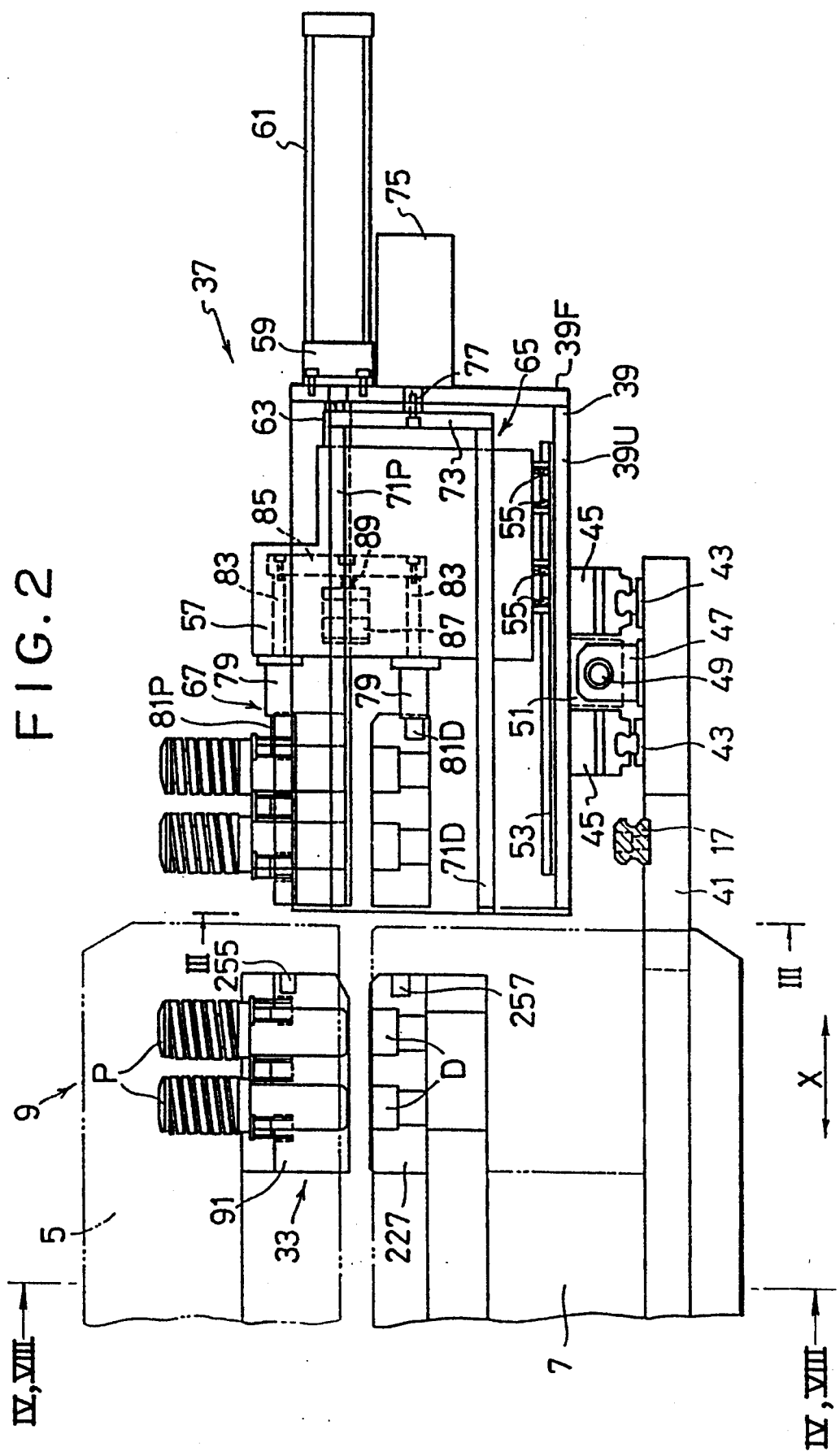
FIG. 2 is a sectional view in a large scale taken in the direction of arrow II in FIG. 1.
Figure 3:
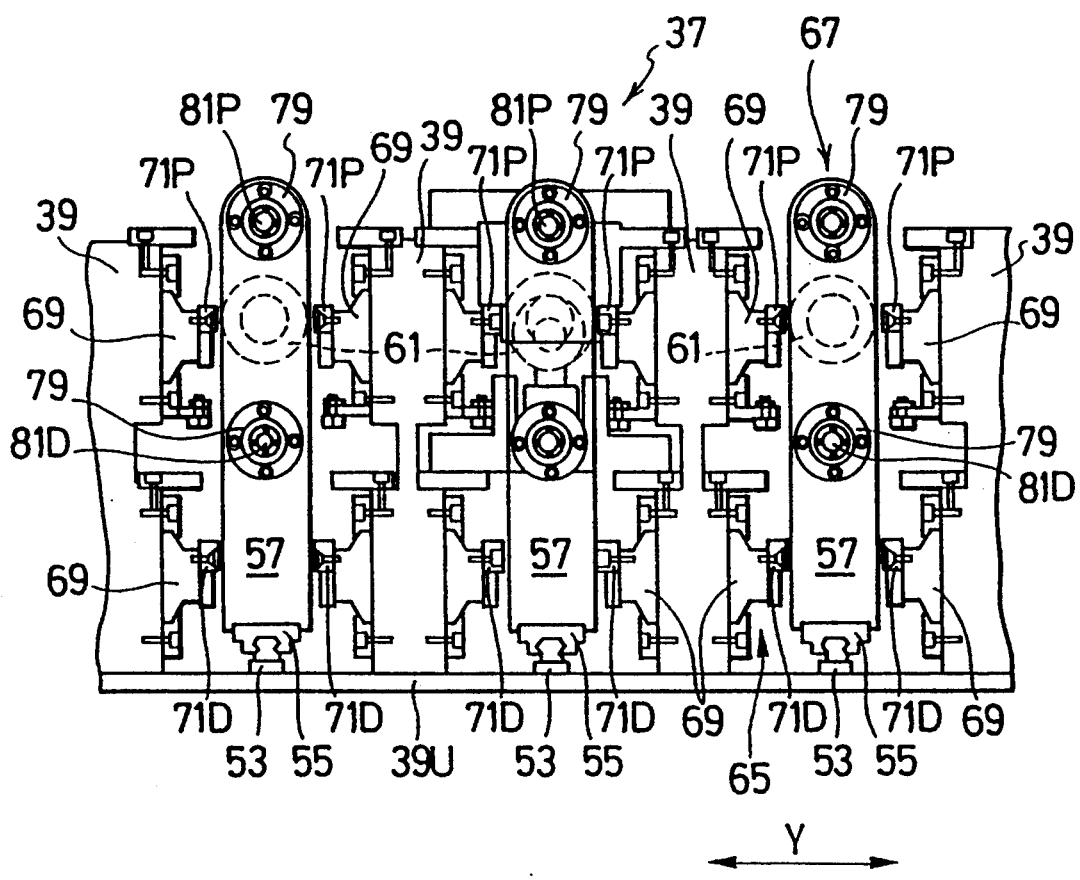
FIG. 3 is a section view along the line III—III in FIG. 2.

As shown in detail in FIGS. 1–3, a plurality of guide rails 43 which extend in a parallel direction Y are disposed on a lower frame 41 of the turret punch press 1, and all of the housings 39 are slidably mounted integrally on the guide rails 43 through guide members 45.

A ball screw 49 is rotatably supported by bearings 47 mounted on both ends of the lower frame 41, and a nut member 51 fixed to a common bottom plate 39U of the housings 39 is engaged with the ball screw 49.

When a driving motor (not shown) is actuated, the ball screw rotates, and then the housings 39 move in the direction Y through the nut member 51. The housings 39 move smoothly since they are guided by the guide rails 43.

A plurality of guide rails 53 spaced appropriately and extended in a parallel direction X are disposed on the bottom plate 39U of the housings 39, and a plurality of X-axis carriages 57 are mounted on the guide rails 53 through guide members 55.

An X-axis cylinder 61 is mounted on a side wall 39F (FIG. 2) for each housing 39, and an end of a piston rod 63 disposed in the cylinder 61 is attached to an end wall of the X-axis carriage at an upper part.

When the piston rod 63 of the X-axis cylinder 61 is actuated, the X-axis carriage 57 moves in the direction X. The X-axis carriage 57 moves smoothly since it is guided by the guide rails 53.

Each housing 39 is provided with an engagement releasing device 65, while the X-axis carriage is provided with a die holding section 67 for holding the die set 29. The engagement releasing device 65 includes engaging members 71P and 71D which are disposed beside the housing 39 through guiding members 69, and which are connected at one end by a connecting member 73 as shown in FIG. 2.

The engagement releasing device 65 is provided with an engagement releasing cylinder 75 on the wall 39F of the housing 39, and a piston rod 77 is disposed in the engagement releasing cylinder 75. An end of the piston rod 77 is connected to the connecting member 73.

When the piston rod 77 of the cylinder 75 is actuated the engaging members 71P, 71D connected to the connecting member 73 move in the direction X. The engaging members 71P, 71D are guided along the guiding members 69 when moved.

The die holding section 67 includes two holding bars 79 which are mounted on the X-axis carriage 57, and to top ends of which chuck devices 81P, 81D are attached as shown in FIGS. 2 and 3. The holding bars 79 are connected integrally to two connecting bars 83, respectively, which extend in the direction X. The connecting bars 83 are connected with each other at one end by a connecting member 85. The X-axis carriage 57 is provided with a holding cylinder 87 in which a piston rod 89 is attached, and a top end of the piston rod 89 is fixed to the connecting member 89.

When the piston rod 89 of the cylinder 87 is actuated, the chuck devices 81P, 81D move in the direction X through the connecting member 85 and the connecting bars 83.

A die set 29 is attached in the die set attaching area 33 in an exchangeable manner. As shown in detail in FIG. 2 and FIGS. 4 to 7, a U-shaped cut 5V is formed in the upper portion 5 of the turret 9 at the die attaching area 33, for attaching a die base or die holder 91 holding, for example, two punches P. The die base 91 is charged from and discharged to the right side (FIG. 6). Structure for holding the punches P in the die base 91 is not described herein since it is known.

In the die base 91, engaging members 95 with engaging portions 93 are disposed (FIG. 5, on the right and left of an upper part), while pins 97 as engaging members which engage the engaging members 95 are disposed to slide vertically in the upper portion 5 of the turret 9. At a lower part of each engaging pin 97 in the upper portion 5 of the turret 9, there is formed a cut 5C in which an L-shaped supporting block 99 is disposed and fixed to the upper portion 5 with bolts. A hole is formed vertically through the supporting block 99, and a threaded bar 101 is inserted in the hole. An end of the threaded bar 101 is fixed to the engaging pin 97, and another end is fixed integrally to a supporting block 105 which supports a cam follower 103 in a rotatable manner. A spring 107 is disposed between the engaging pin 97 and the supporting block 99. The spring 107 is normally energized to press the engaging pin 97 upwards. The die base 91 and the upper portion 5 are designed so that the engaging pins 97 of the upper portion 5 of the turret 9 engage the engaging members 95 of the die base 91 by means of the energized springs 107 when the die base 91 is charged and positioned. Therefore, positioning of the die base 91 is carried out precisely in the upper portion 5 of the turret 9 in the die attaching area 33.

Figure 4:
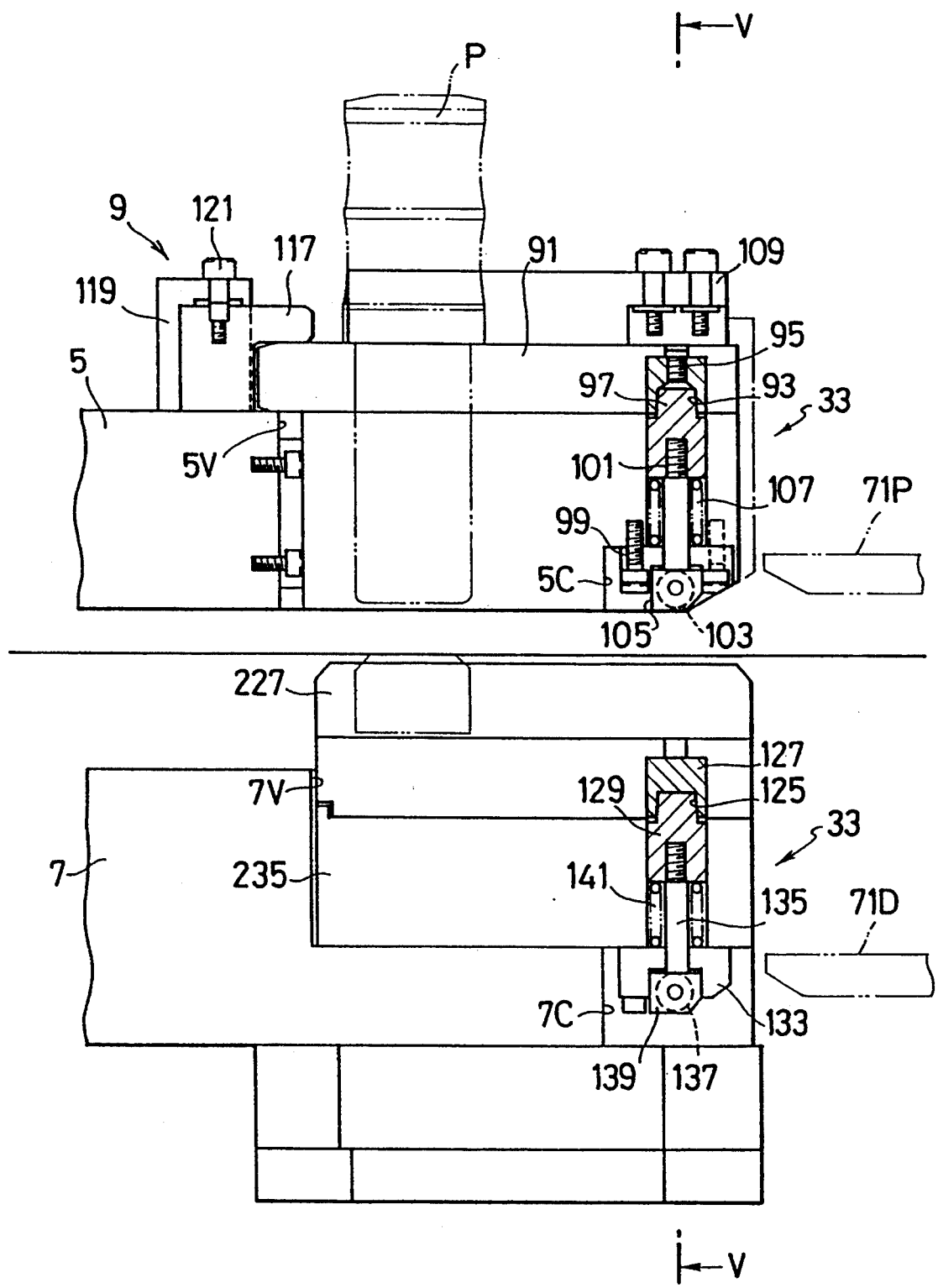
FIG. 4 is a sectional view in a large scale taken along the line IV—IV in FIG. 2.
Figure 5:
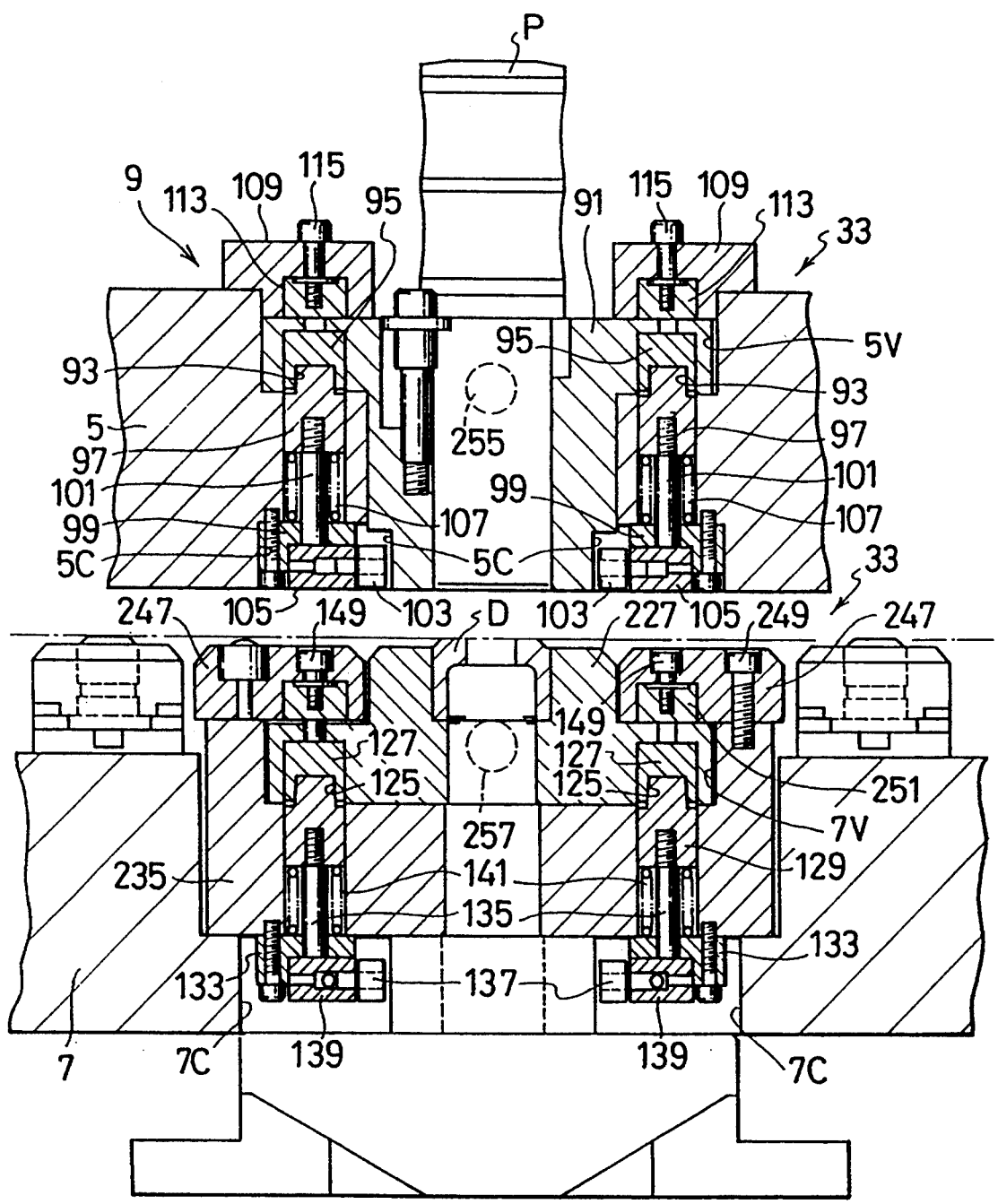
FIG. 5 is a sectional view taken along the line V—V in FIG. 4.
Figure 6:
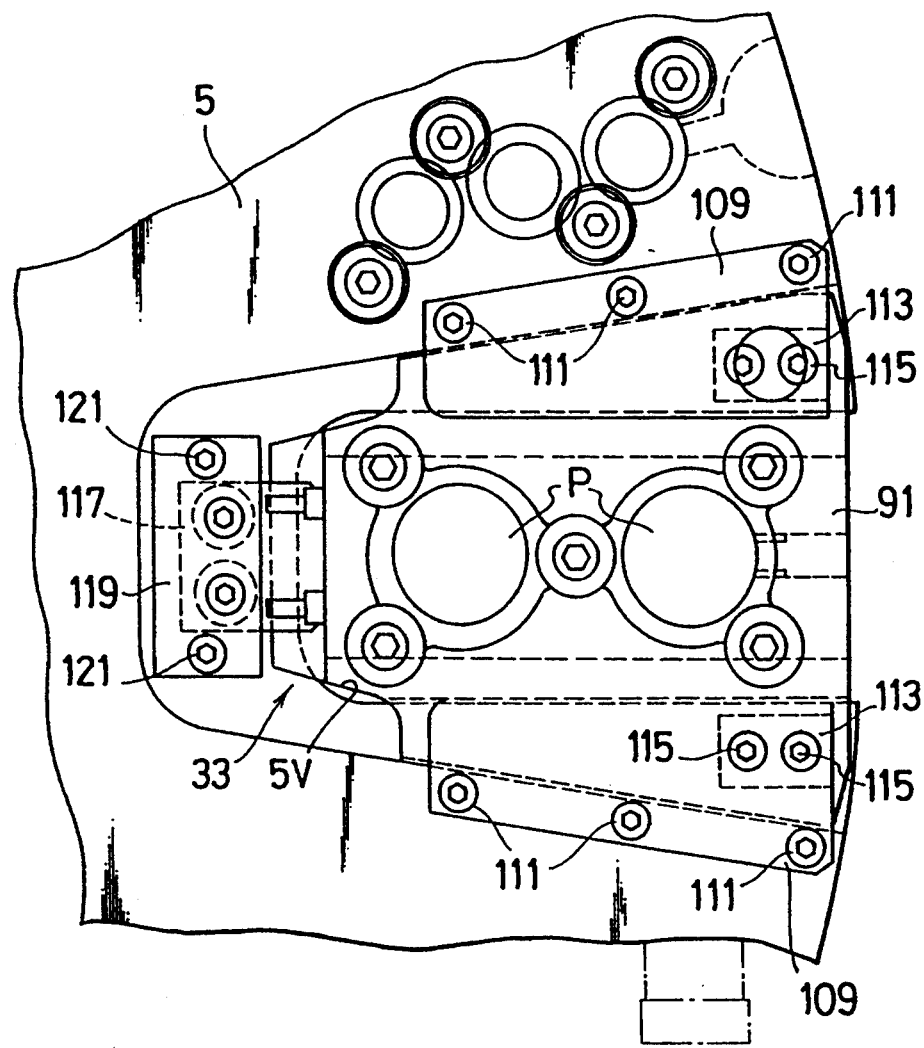
FIG. 6 is a plan of an upper part of a turret shown in FIG. 4.

As shown in FIGS. 5 and 6, a pair of holding members 109 are attached with bolts 111 to a top surface of the upper portion 5 of the turret 9 at both sides of the cut 5V for holding the die base 91 within the cut 5V. For protecting the die base 91 so as not to be damaged when it is charged in the die attaching area 33, an elastic member 113 made of gum or other material is fixed by means of bolts 115 under each holding member 109 at an end portion of the holding member 109, which is an entrance of the die attaching area 33 for the die base 91. In addition, an L-shaped holding member 117 is attached with bolt 121 through a bracket 119 to the upper portion 5 near a front end of the cut 5V as shown in FIGS. 4 and 6 for holding the die base 91 within the cut 5V.

Figure 7:
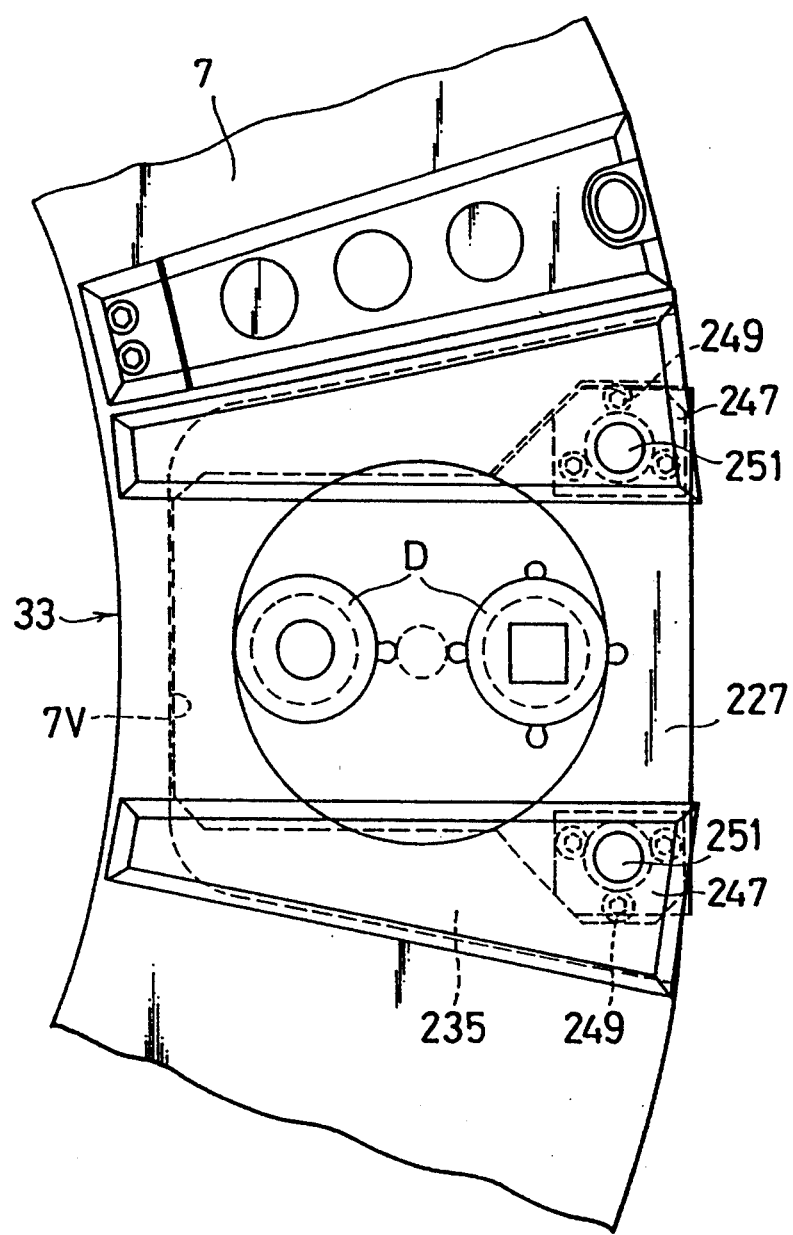
FIG. 7 is a plan of a lower part of the turret shown in FIG. 4.

In the lower portion 7 of the turret 9 a U-shaped cut 7V is formed as the die attaching area 33 for attaching a die base or die holder 227 holding two dies D. The die base 227 is charged from and discharged to the right side (FIG. 7). Structure for holding the dies D in the die base 227 is not described herein since it is known.

In the die base 227, engaging members 127 with engaging portions 125 are disposed (FIG. 5, on the right and left of a lower part), while pins 129 as engaging members which engage with the engaging members 127 are disposed to slide vertically in a supporting member 235 fixed to the lower portion 7 of the turret 9. At a lower part of the each engaging pin 129 in the lower portion 7 of the turret 9 there is formed a cut 7C in which an L-shaped supporting block 133 is disposed and fixed to the supporting member 235 with bolts. A hole is formed vertically through the supporting block 133, and a threaded bar 135 is inserted in the hole. An end of the threaded bar 135 is fixed to the engaging pin 129, and another end is fixed integrally to a supporting block 139 which supports a cam follower 137 in a rotatable manner. A spring 141 is disposed between the engaging pin 129 and the supporting block 133. The spring 141 is normally energized to press the engaging pin 129 upwards. The die base 227 and the lower portion 7 are so designed that the engaging pins 129 of the lower portion 7 of the turret 9 engage with the engaging members 127 of the die base 227 by means of the energized springs 141 when the die base 227 is charged and positioned. Therefore, positioning of the die base 227 is carried out precisely at the die attaching area 33 of the lower portion 7 of the turret 9.

As shown in FIGS. 5 and 7, a pair of holding members 247 are attached with bolts 249 to the supporting member 235 at both sides of the cut 7V for holding the die base 227 within the cut 7V. For protecting the die base 227 so as not to be damaged when it is charged in the cut 7V of the die attaching area 33, an elastic member 251 made of gum or other material is fixed by means of bolts 149 under each holding member 247 at an end portion of the holding member 247, which is an entrance of the die attaching area 33 for the die base 227.

As shown in FIG. 4, when the engaging members 71P, 71D of the engagement releasing device 65 are moved to the turret 9, inclined parts or ends of the engaging members 71P, 71D contact and press down the cam followers 103, 137, and then the engaging pins 97, 129 extend down through the supporting blocks 105, 139 and the threaded bars 101, 135 against force of the springs 107, 141. Therefore, the pins 97, 129 disengage from the engaging members 95, 127, and then the die bases 91, 227 become free from the upper portion 5 and the supporting member 235 of the lower portion 7, respectively that is, ready to be discharged from the die set attaching area 33.

Then, the chuck devices 81P, 81D are moved to the turret 9 and inserted in holes 255, 257 formed in the die bases 91, 227. When the chuck devices 81P, 81D, which are for example known collet chucks, are inserted in the holes 255, 257, the die bases 91, 227 are held automatically with the chuck devices 81P, 81D.

Now, an operation for exchanging all die sets (two sets for this example) attached in the die set attaching areas 33 of the turret 9 is explained. The operation includes taking out the new die sets 29 from the die set storage section 31 and charging the die sets 29 into all of the die set attaching areas 33 when each area 33 is at the die exchanging position 35 and discharging die sets from each area 33 at the die exchanging position 35 and storing the die sets taken out from each area 33 in the die set storage section 31.

First, all of the housings 39, each of which is now empty, are moved in the direction Y until they come in front of the die set storage section 31. Then, the X-axis cylinders 61 for two housings of the three are actuated to move the X-axis carriages 57 towards the die set storage section 31, and the holding cylinders 87 are actuated for the two housings to move the chuck devices 81P, 81D forwards in the direction X until the chuck devices are inserted in the holding holes 255, 257 of die bases 91, 227 of two die sets 29 which are arranged in the storage section 31 at a same height of the die set attaching area 33 at the die exchanging position 35. By the action of the cylinders 61, 87, two housings 39 of the three hold two die sets.

Then, all of the housings 39 are moved in the direction Y towards the turret 9 so that an empty housing 39 stands at the die exchanging position 35. The X-axis cylinder 61 is then actuated to move the X-axis carriage 61 for the empty housing 39 until the carriage 61 comes near the turret 9. Next, the engagement releasing cylinder 75 is actuated to enable the engaging members 71P, 71D to press down the cam follower 103, 137, and therefore a die set 29 which is engaged with the turret 9 is disengaged from it as described above. Then, the holding cylinder 87 is actuated until the chuck devices 81P, 81D come in the holes 255, 257 formed in the die bases 91, 227 to hold the die bases 91, 227, and then the die set 29 is discharged from the turret 9 by actuating the cylinder 87. The engagement releasing cylinder 75 and the X-axis cylinder 61 are then actuated to withdraw the engaging members 71P, 71D and the X-axis carriage 57, respectively, away from the turret 9. The engaging pins 97, 129 are raised by action of the energized springs 107, 141 as the engaging members 71P, 71D have been withdrawn from the turret 9.

Next, housings 39 are slightly moved in the direction Y so that one of housings 39 which holds a die set 29 taken out from die set storage section 31 is located at the die exchanging position 35, and the engagement releasing cylinder 75 is actuated to press down the cam follower 103, 137, while the X-axis carriage 57 is moved forwards to charge the die set 29 into the die attaching area 33 which is at the die exchanging position 35.

Then, the holding cylinder 87 is operated to withdraw the chuck devices 81P, 81D from the holding holes 255, 257, while the engagement releasing cylinder 75 is operated to withdraw the engaging members 71P, 71D. Therefore, the engaging pins 97, 129 engage with the engaging portions 93, 125 of the engaging members 95, 127 by action of the springs 107, 141, and the die set 29 is set in the die attaching area 33.

By operating the automatic die exchanging device, another die set 29 in a die attaching area 33 is discharged from the turret 9 after the die attaching area 33 is located at the die exchanging position 35 by rotating the turret 9, and another die set 29 taken out from the die set storage section 31 is set in the die attaching area 33 in the same way as described above.

By the above operation, exchange of all die sets 29 on the turret 9 is completed. Then, two die sets 29 discharged from the turret 9 are stored in the die set storage section 31, if necessary.

When exchanging only one of two die sets is required, a housing 39 is used to take out one die set from the die set storage section 31, and an empty housing is used to discharge a die set to be exchanged from the turret 9.

As described above, all of the die sets 29 on the turret 9 are exchanged only by the movement of the die exchanging device 37 from the die set storage section 31 to the turret 9, and therefore, it is possible to shorten time for exchanging the dies. Furthermore, as a moving area of the die exchanging device 37 overlaps a part of a moving area of the workpiece positioning device 21 in the direction Y, width of the turret punch press 1 can be smaller than a conventional press.

In addition, as the die exchanging device 37 is provided with a plurality of housings 39 to exchange a plurality of die sets 29 at a time, it is possible to shorten time for exchanging some die sets required for processing.

Furthermore, in the above described turret punch press of the present invention, the die bases are charged into and discharged from the upper and the lower portions of the turret horizontally by the die exchanging device; therefore exchanging die sets will be carried out with ease even if a space between the upper portion and the lower portion is small in a vertical direction.

Not limiting the embodiment described above, any modification may be carried out for the embodiment within the scope or this invention.

The press can be, for example, provided with more than three die attaching areas and the housings. The die set storage area 27 may be disposed outside the press instead of in the portal frame 3 of the press. Furthermore, the engaging pins 97, 129 may be rotated for engaging the engaging members 95, 127 instead of moving vertically.

In FIGS. 1 to 3, and 7 to 10, a turret punch press 1 of a second embodiment of the present invention is shown. FIG. 7 is a plan for a lower portion of the turret 9 of a turret punch press of the first embodiment. However, FIG. 7 is also a plan for a lower portion of a turret 9 of the turret punch press 1 of the second embodiment, and therefore the plan is referred to here.

An outline of structure of the turret punch press 1 is the same as the first embodiment described above. Same numerals are used for most of the same structural elements in the second embodiment.

A feature of the turret punch press of the second embodiment is that the press has other elements for fixing the die set 29 in the die attaching area 33. This feature is now described in detail.

Figure 8:
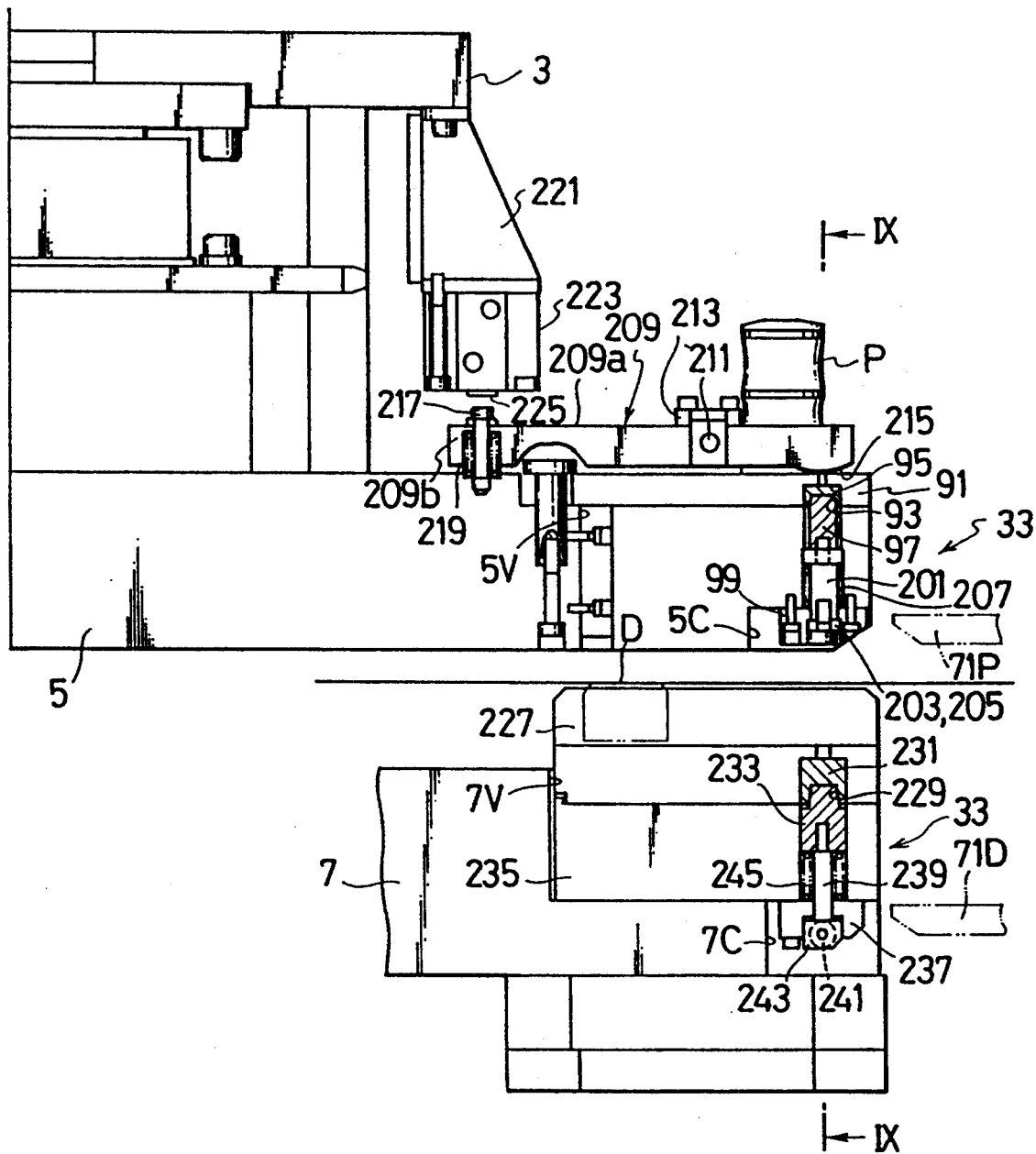
FIG. 8 is a sectional view in a large scale taken along the line VIII in FIG. 2 showing the primary part of a second example of a turret punch press of the present invention.
Figure 9:
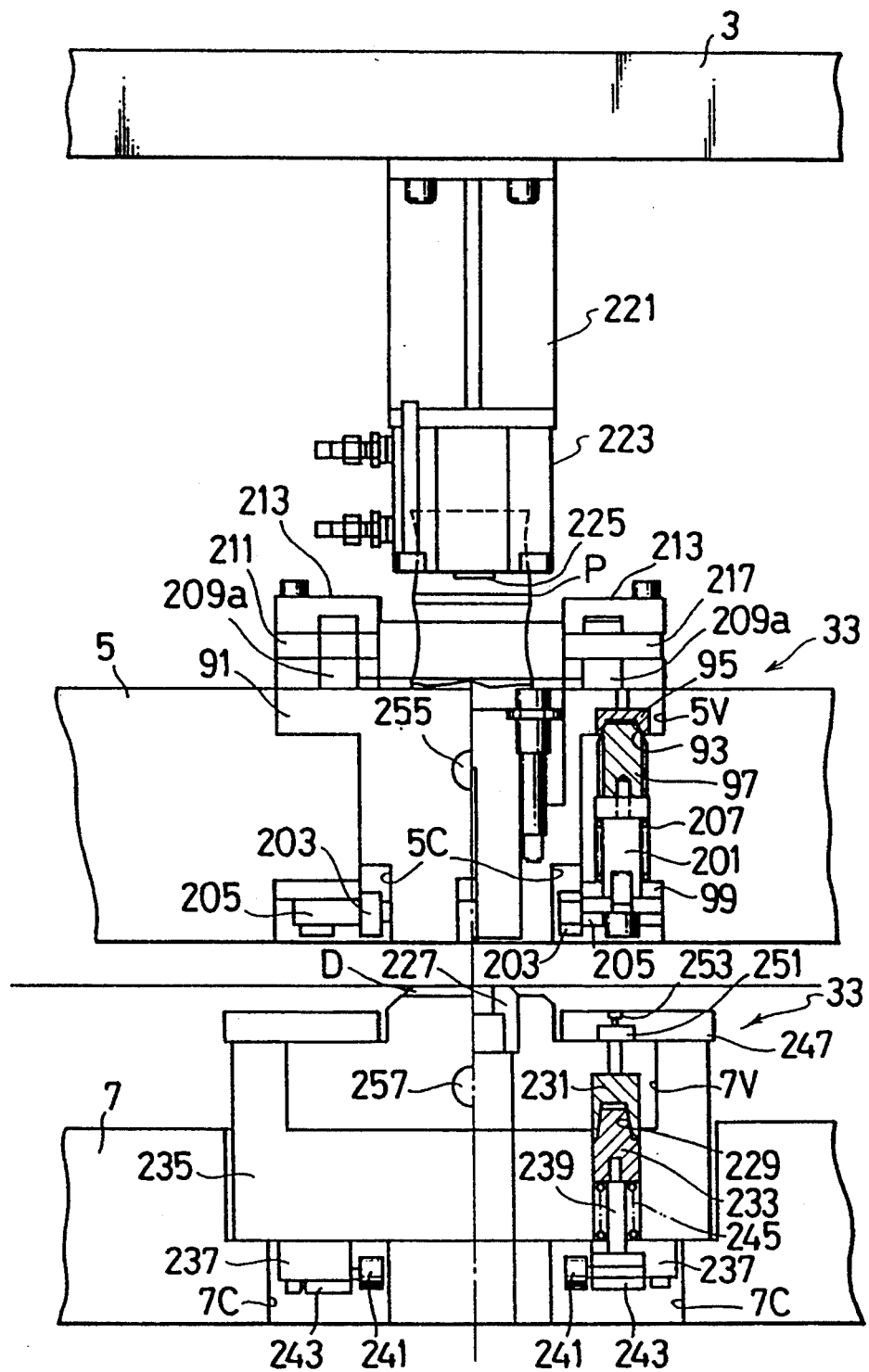
FIG. 9 is a sectional view along the line IX—IX in FIG. 8.
Figure 10:
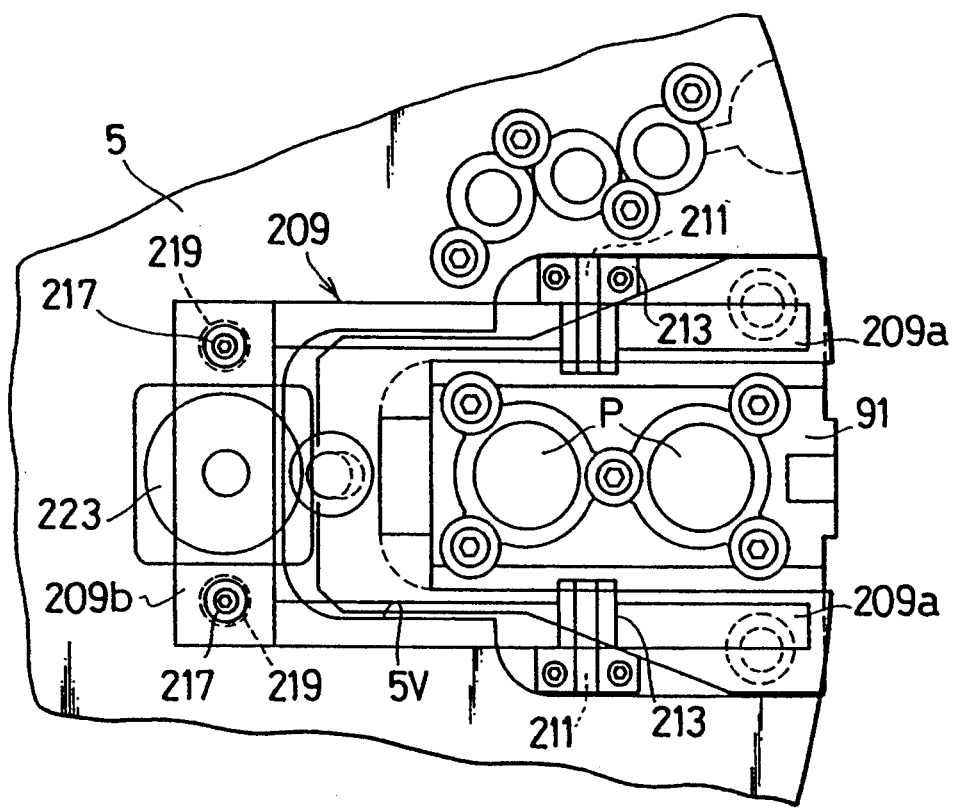
FIG. 10 is a plan of an upper part of a turret shown in FIG. 8.

In FIGS. 8 to 10, the die base 91 attached in the upper portion 5 of of the turret 9 is shown. The die base 91 is provided with engaging members 95 having conical engaging parts 93. In the upper portion 5 of the turret 9, two engaging members or pins 97 are slidably disposed for engaging the engaging parts 93 of the engaging members 95 of the die base 91, and also a cut 5C is formed at a lower part of the each engaging pin 97. An L-shaped supporting block 99 is disposed in each cut 5C and is fixed to the upper portion 5 by means of bolts. A hole is formed vertically through the supporting block 99, and a threaded bar 201 is inserted in the hole. An end of the threaded bar 201 is fixed to the engaging pin 97, and another end is fixed integrally to a supporting block 205 which supports a cam follower 203 in a rotatable manner. A spring 207 is disposed between the engaging pin 97 and the supporting block 99. The spring 207 is normally energized to press the engaging pin 97 upwards.

A fixing member 209 is mounted on the upper portion 5 for pressing down the die base 91 so as not to come upwards out of the attaching area 33. The fixing member 209 is U-shaped as shown in FIG. 10, and is supported by pins 211 which are inserted in levers 209a of the member 209, and which are supported by bearings 213 fixed to the portion 5 of the turret 9, so that the member 209 rotates freely around the pin 211. A base 209b of the fixing member 209 is attached to the portion 5 with two bolts 217 embedded in the portion 5, and is normally pressed upwards by action of tension springs 219 disposed around the bolts 217 between the base 209b and the portion 5. Therefore, round lower surfaces 215 formed at front ends of the fixing member 209 press down the die base 91.

On the other hand, a driving member 223 is supported from the portal frame 3 through a bracket 221 for pressing down the base 209b of the fixing member 209. The driving member 223 is, for example, a pneumatic cylinder provided with a piston rod 225.

When the cylinder or driving member 223 is actuated, the piston rod or pressing member 225 extend and presses a central part of the base 209b of the fixing member 209 against the spring force. Therefore, the levers 209a rotate counterclockwise about the pins 211, and the round lower surfaces 215 rise apart from an upper surface of the die base 91. When the fixing member 209 is in this state, the die 91 is charged or discharged from the upper portion 5 of the turret 5.

When the cylinder 223 is actuated to withdraw the piston rod 225 from the base 209b, the fixing member 209 rotates clockwise by the action of the spring 219 and presses down the die base 91 to fix it securely to the portion 5.

In the lower portion 7 of the turret 9 in the die attaching area 33, a U-shaped cut 7V is formed for attaching a die base or die holder 227 holding two dies D (FIG. 2). The die base 227 is charged from and discharged to the right side (FIG. 7).

As shown in FIGS. 8 and 9, engaging members 231 with engaging portions 229 are disposed in the die base 227, while engaging pins or members 233 for engaging the engaging members 231 are disposed to slide vertically in a supporting member 235 fixed to the lower portion 7 of the turret 9. At a lower part of the each engaging pin 233 in the lower portion 7 of the turret 9 there is formed a cut 7C in which an L-shaped supporting block 237 is disposed and fixed to the supporting member 235 with bolts. A hole is formed vertically through the supporting block 237, and a threaded bar 239 is inserted in the hole. An end of the threaded bar 239 is fixed to the engaging pin 233, and another end is fixed integrally to a supporting block 243 which supports a cam follower 241 in a rotatable manner. A spring 245 is disposed between the engaging pin 233 and the supporting block 237. The spring 245 is normally energized to press the engaging pin 233 upwards. The die base 227 and the lower portion 7 are so designed that the engaging pin 233 of the lower portion 7 of the turret 9 engages the engaging member 231 of the die base 227 by means of the energized spring 141 when the die base 227 is charged and positioned. Therefore, positioning of the die base 227 is carried out precisely in the lower portion 7 of the turret 9 in the die attaching area 33.

As shown in FIGS. 7 and 9, a pair of holding members 247 are attached with bolts 249 to the supporting member 235 at both sides of the cut 7V for holding the die base 227 within the cut 7V. For protecting the die base 227 so as not to be damaged when it is charged in the cut 7V of the die attaching area 33, an elastic member 251 made of gum or other material is fixed by means of bolts 253 under each holding member 247 at an end portion of the holding member 247, which is all entrance of the die attaching area 33 for the die base 227.

As shown in FIG. 8, when the engaging members 71P, 71D of the engagement releasing device 65 are moved to the turret 9, inclined parts of ends of the engaging members 71P, 71D contact and press down cam followers 203, 241, and the engaging pins 97, 233 extend down through the supporting blocks 205, 243 and threaded bars 201, 239 against force of the springs 207, 245. Therefore, the pins 97, 233 disengage from the engaging members 95, 231, and then the die bases 91, 227 become free from the upper portion 5 and the supporting member 235 of the lower portion 7 respectively; that is ready to be discharged from the die set attaching area 33.

Then, the chuck devices 81P, 81D are moved to the turret 9 and inserted in the holes 255, 257 formed in the die bases 91, 227 (FIG. 2). When the chuck devices 81P, 81D, are inserted in the holes 255, 257, the die bases 91, 227 are held automatically with the chuck devices 81P, 81D as described above.

An operation for exchanging all of the die sets will be carried out as described above. However, a different point from the first embodiment is that the fixing member 209 is used during the operation. When a die set 29 is charged or discharged from the turret 9, the driving member 223 is activated to press down the base 209b of the fixing member 209 so that the contact surfaces 215 of the fixing member 209 are raised. The fixing member 209 is used to press down the die set 29 after the die set 29 has been charged in the turret 9.

Figure 11:
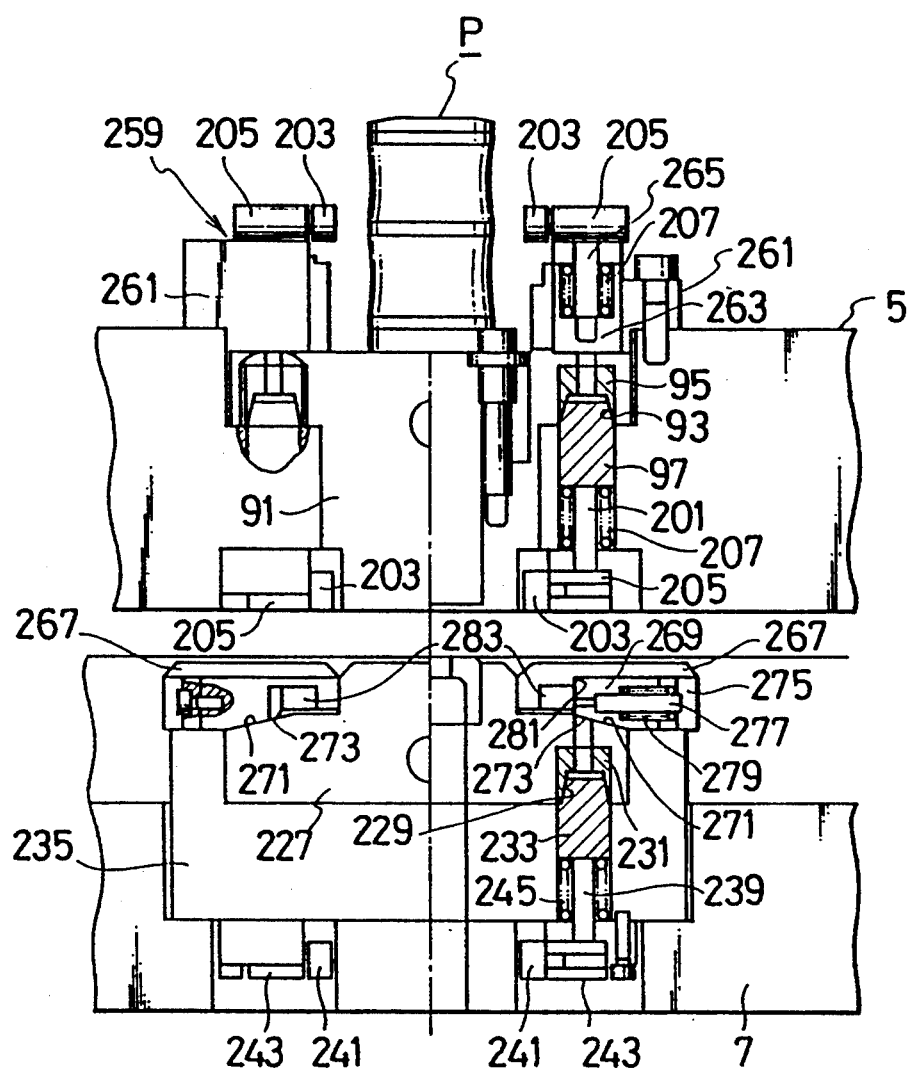
FIG. 11 is a sectional view of a modified part of the second example of the punch press.
Figure 12:
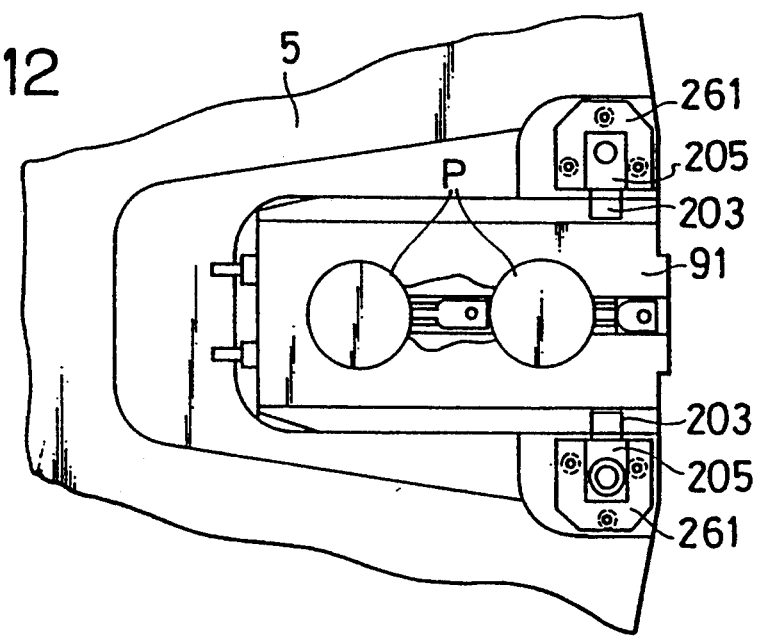
FIG. 12 is a plan of an upper part of a turret shown in FIG. 11.
Figure 13:
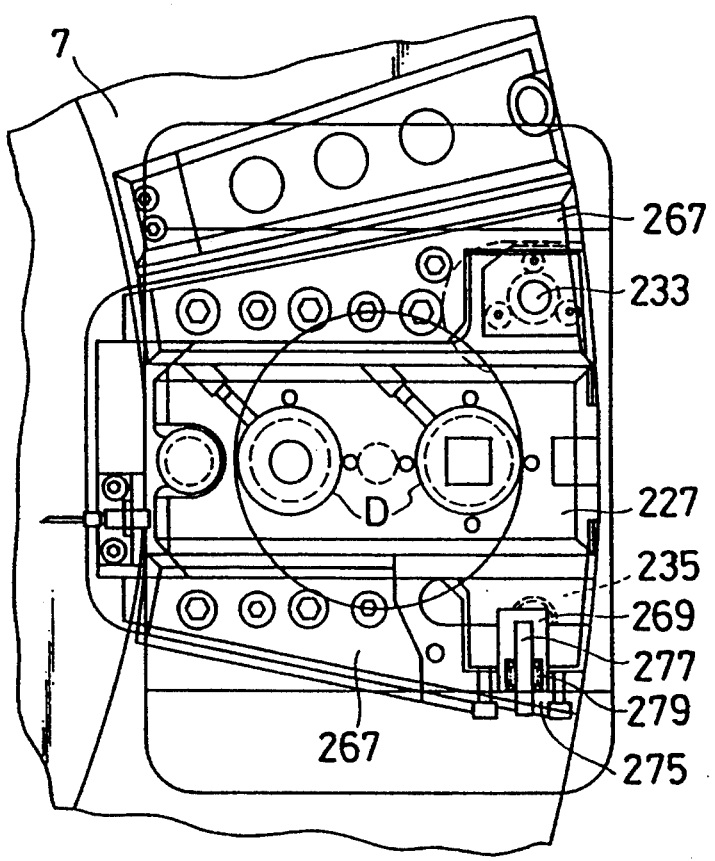
FIG. 13 is a plan of a lower part of the turret shown in FIG. 11.

In FIGS. 11 to 13, a modified example of the second embodiment is shown, in which the same reference numerals are used for the same elements, and description is omitted for the same elements. For this modified example, pressing elements for pressing down the die bases 91, 227 in the upper and lower portions 5, 7 are different from the example shown in FIGS. 7 to 10.

Elements for pressing a die base 91 attached in the upper portion 5 of the turret 9 are pressing members 259 which are disposed on a supporting block 261 mounted on the upper portion 5. An engaging member 263 is inserted in each supporting block 261. A threaded bar 265 is inserted and fixed in the engaging member 263, and an upper end of the threaded bar 265 is integrally fixed to a supporting block 205 by which a cam follower 203 is rotatably supported. A spring 207 is disposed between the engaging member 263 and the supporting block 261 so that the engaging member 263 is normally pressed downwards by the spring 207.

Elements for pressing a die base 227 attached in the lower portion 7 of the turret 9 are pressing members 267 which are fixed to the supporting member 235 of the lower portion 7 by means of bolts, etc. All engaging member 269 slidable to the right and the left (FIG. 11) is disposed in each pressing member 267 as a fixing member for fixing the die base 227 in the portion 7. On a part of a bottom of the engaging member 269, an inclined surface is formed for sliding in contact with an inclined surface formed on the die base 227. A guide bar 277 for guiding the engaging member 269 is fixed to a base plate 275 which is formed integrally in the pressing member 267. A coil spring 279 is disposed around the guide bar 277 and between the engaging member 269 and the base plate 275, and is normally energized to press the engaging member 269 towards the left side for pressing down the die base 227. The pressing member 267 is provided with a step 281 at which the engaging member 269 stops, and with a hole in which the engaging member 71D of the engagement releasing device 65 is to be inserted.

When inclined parts of front ends of engaging members 71P, 71D of an engagement releasing device 65 (not shown) come into contact with and raise the cam followers 203, 241, and when inclined parts of front ends of other engaging members 71D of the engagement releasing device 65 move into the holes 283 and come into contact with and press the engaging members 269 towards the right side, the die bases 91, 227 are disengaged from the portions 5, 7.

As described above, fixing releasing elements such as engagement releasing device 65 and the driving member 223 are disposed outside the turret 9, and only fixing elements such as the engaging or fixing members 209, 263, 269 and pins 97, 129, 233 and springs 107, 207, 141, 219, 279, which are relatively small, light, and of simple structure, are mounted on the turret 9 in the turret punch press of the second embodiment So, the turret 9 can be of compact size and simple structure, and therefore it does not require a large space, and is manufactured at low cost and easy to maintain. In addition, positioning of die bases is carried out with ease and preciseness due to the conical engaging parts 93, 229.

In FIGS. 14–23, a turret punch press of a third embodiment and a die exchanging device of the present invention are described.

Figure 14:
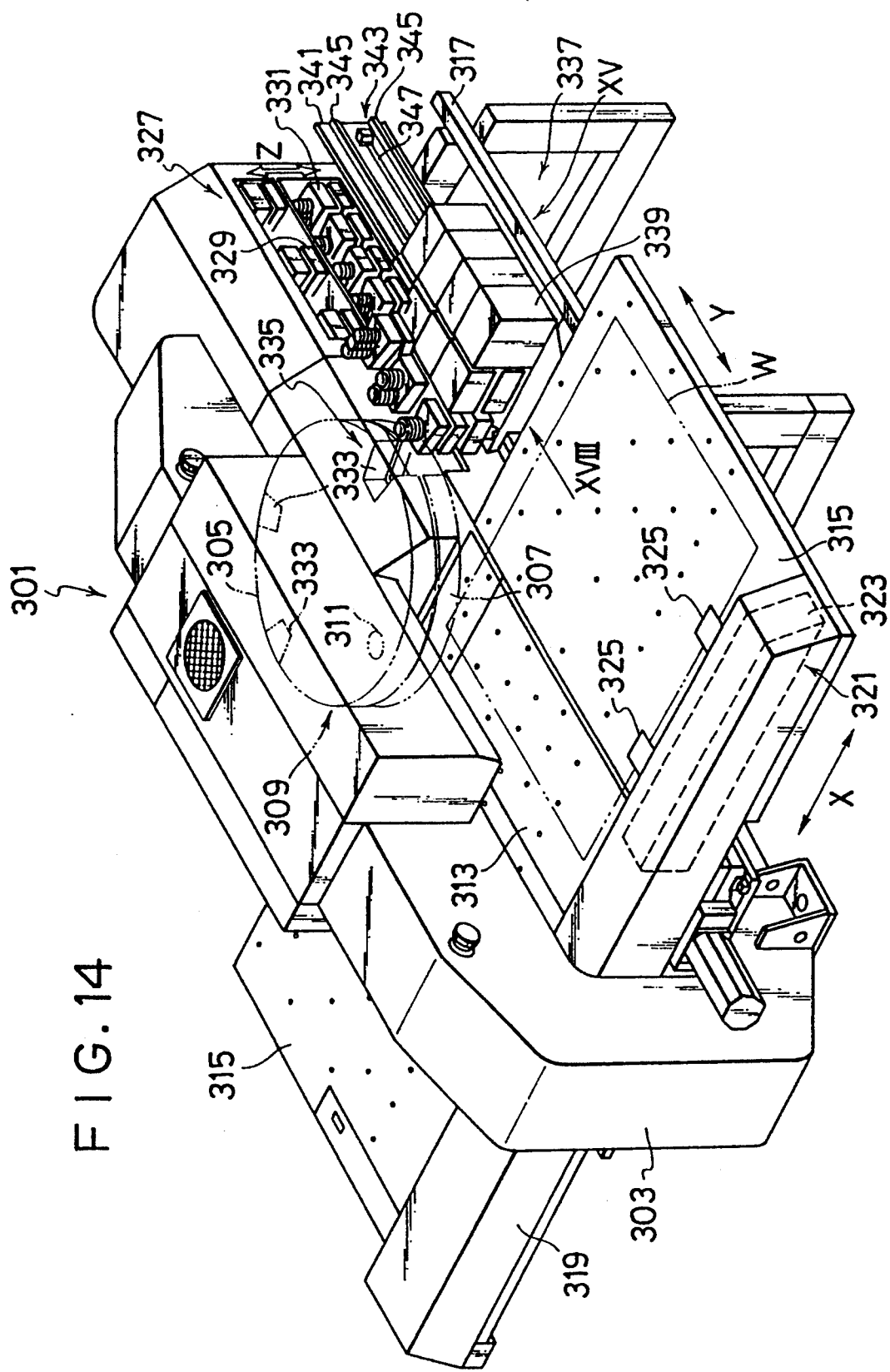
FIG. 14 is a perspective drawing of a third example of a turret punch press of the present invention.

In FIG. 14, a turret punch press 301 is provided with a portal frame 303 in which at the central part, a turret 309 includes an upper portion 305 and a lower portion 307 being supported by the frame 303. A plurality of die sets 329 are to be attached in the turret 309 at die set attaching areas 333 which are formed at a circumferential part of the turret 309.

A processing location 311 is disposed in the turret punch press 301. After the turret 309 is rotated so that a die set 329 on the turret 309 is positioned at the processing location 311, a punching process starts on a workpiece W which has been positioned at the processing location 311. The punching is carried out by means of a punch P and a die D. The punch P is pressed by a striker (not shown) which is disposed above the processing location 311 and is actuated by driving means (not shown) disposed on the frame 303.

The punch press 301 has a fixed center table 313 under the portal frame 303 and two movable tables 315 provided beside the fixed center table 313. The movable tables 315 are guided by guides 317 which extend in a direction Y, and are therefore moved smoothly along the guides 317. At left ends of the movable tables 315 a carriage base 319 extended in a direction X and provided with a positioning device 321 for positioning a workpiece W on the tables 313, 315 is disposed. The carriage base 319 is provided with a carriage 323 which is movable in the direction X and to which a plurality of clamps 325 are attached for holding the workpiece W.

Therefore, the workpiece W held by the clamps 325 is moved in the directions X and Y when the movable tables 315 are moved in the direction Y and the carriage 323 is moved in the direction X, and then the workpiece W is subject to a punching process at the processing location 311.

In the turret punch press 301, the turret 309 is located on the center, the workpiece positioning device 321 on the left side, and a die set storage area 327 in the portal frame 303 on the right side which is opposite to the workpiece positioning device 321. The die set storage area 327 includes a die set storage section 331 in which a large number of die sets 329, each including an upper die having an appropriate number of punches and a lower die, are stored and spaced from each other in the directions Y and Z. The die sets 329 can be moved in the storage section 331 at least in the direction Z by conventional known means.

A plurality of die set attaching areas 333 are formed in almost U-shaped cuts on the circumferential part of the turret 309 for attaching die sets 329. The die set attaching areas 333 are spaced from each other appropriately and opposed to each other. The turret 309 can be rotated, so that each die set attaching area 333 can be positioned at a die exchanging position 335.

In front of the die exchanging position 335 and the die set storage section 331, a die exchange device 337 is disposed, which is movable in the direction X and Y and is provided with a plurality of housings 339 or die carrying sections. The number of the die carrying sections or housings 339 is four and is greater by one than the number of the die attaching areas 333 of the turret 309 for this example shown in FIG. 14.

The die exchanging device 337 is also provided with die carrying means 343 which include a plate 341 supported by a support (not shown) and two guide rails 345 mounted on the plate 341 and spaced from each other. The plate 341 and the guide rails 345 extend in a direction Y. All the housing 339 are integrally mounted on the guide rails 341 through guide members 351 (not shown in FIG. 14). A ball screw 347 is mounted on the plate 341 and between the two guide rails 345 for moving the housing 339 horizontally.

Figure 15:
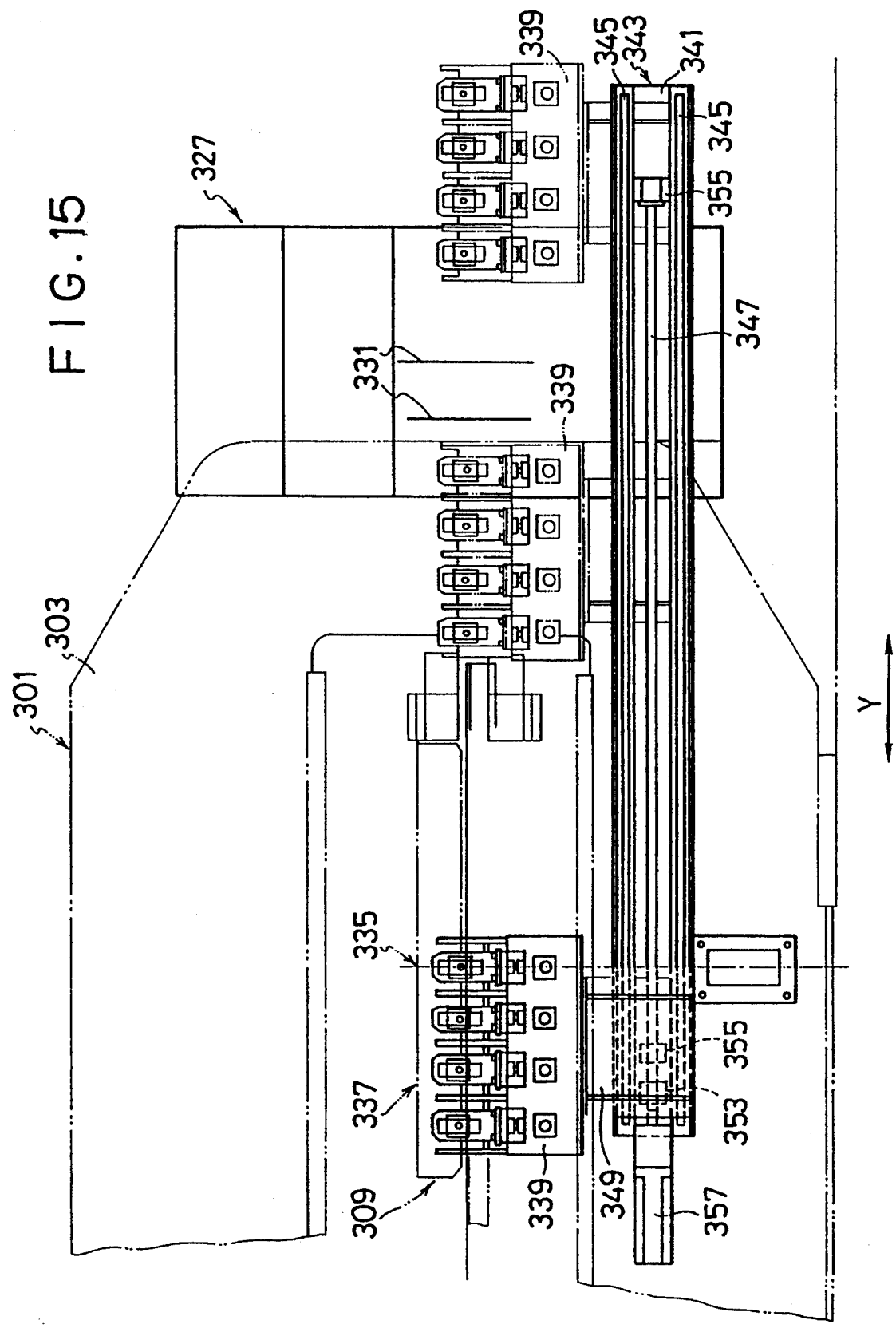
FIG. 15 is a front view in a large scale taken in the direction of arrow XV in FIG. 14.
Figure 16:
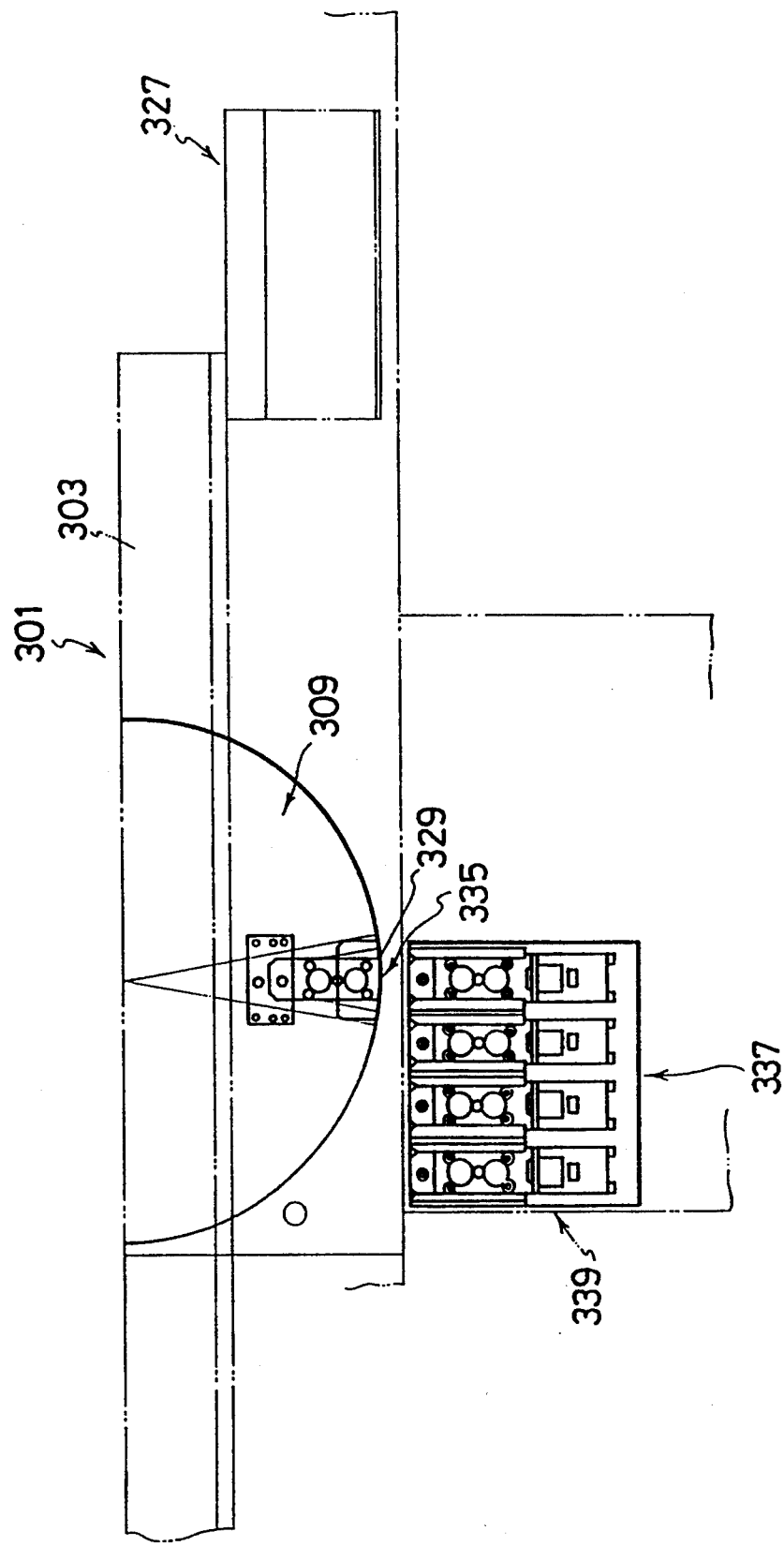
FIG. 16 is a plan of the part of the punch press shown in FIG. 15.
Figure 17:
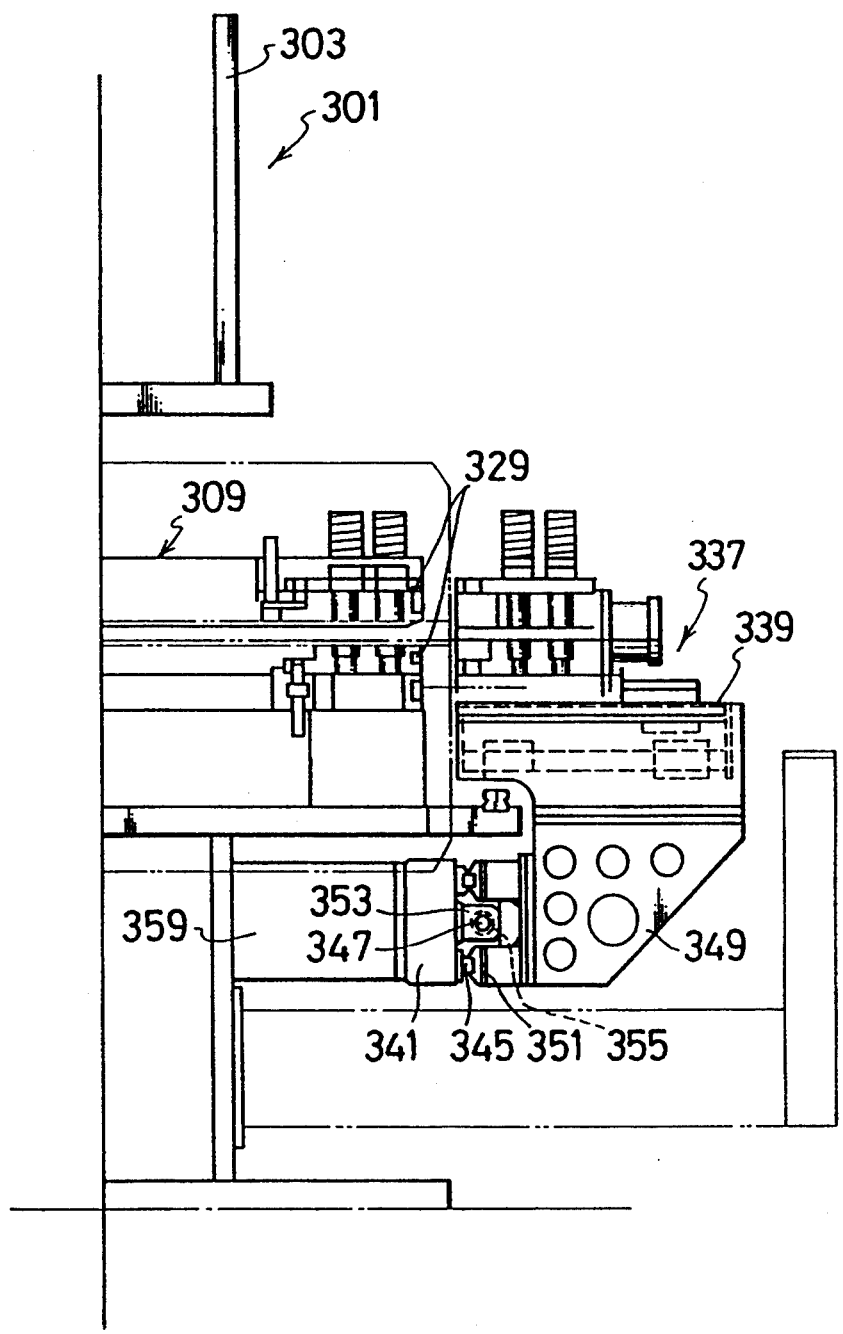
FIG. 17 is a left side elevation of the part of the punch press shown in FIG. 15.

In FIGS. 15 to 17, details about the die carrying means 343 are described. The plate 341 is supported by a support through a bracket 359 as shown in FIG. 17. The guide rails 345 on the plate 341 are engaged with guide members 351 such as LM guides, etc. fixed to a bracket 349 which supports the housing 339. The ball screw 347 is supported in a rotatable manner by bearings 353 disposed on the plate 341 as shown in FIG. 15. A threaded nut engages with the ball screw 347 and joins entire housings 339 and the supporting bracket 349. A motor 357 is disposed at an end of the ball screw 347 for driving it.

When the driving motor 357 is actuated, the ball screw 347 rotates, and then the housings 339 move in the direction Y through the nut member 355. The housings 339 moves smoothly since they are guided by the guide rails 345.

In FIG. 15, three positions where the housings 339 stand are shown. At the left position, die sets are charged into and discharged from the turret 309 for exchanging the die sets, at the middle position, the housings 339 stand waiting for next action, and at the right position, die sets are taken out from and stored in the die set storage section 331.

When die sets are used from the storage section 331, the housings 339 of the die exchanging device 337 are located at the right position in front of the storage section 331, and some die sets are taken out and held in the housings, and then the housings wait at the middle position until they receive an order for exchanging the die sets. If the housings receive the order, they move to the die exchanging position 335, and the die sets are exchanged by the die exchange device 337.

In FIGS. 18 to 23, the die exchanging device 337 of the present invention is described in detail.

The guide members 351 are spaced and disposed on a front plate 349a of the supporting bracket 349, and are engaged in a slidable manner with the guide rails 345 which are fixed to a plate 341 mounted on the bracket 359. The ball screw 347 is supported in a rotatable manner by the bearings 353 mounted on the plate 341 at both ends of it, and is also engaged with a nut 355 fixed to the front plate 349a of the supporting bracket 349.

A plurality of guide bars 361 extended in the direction X are disposed in the housing 339. A X-axis carriage 365 is mounted on the guide bars 361 through a plurality of bushings 363.

A rodless cylinder 367 is fixed to the housing 339 by fixing both ends of a cylinder part 369 of the rodless cylinder 367 to the housing 339 with lock nuts 371. A driving portion 373 for driving the cylinder 367 is attached to the X-axis carriage 365.

When the rodless cylinder 367 is actuated, the X-axis carriage 365 moves in the direction X through the driving portion 373. The X-axis carriage 365 moves smoothly since it is guided by the guide bars 361.

Each housing 339 is provided with an engagement releasing device 374, while the X-axis carriage 365 is provided with a die holding section 375 for holding the die set 329. The engagement releasing device 374 includes engaging members 379P and 379D which are disposed beside the housing 339 through guiding members 377, and which are connected at one end by a connecting member 381 as shown in FIGS. 18 and 19.

The engagement releasing device 374 is provided with an engagement releasing cylinder 385 disposed in a rotatable manner on the front plate 349a of the supporting bracket 349 through a hinged block 383, and a piston rod 387 is disposed in the engagement releasing cylinder 387. A joint 389 is disposed for connecting an end of the piston rod 387 and an end of the link 391. The link 391 is hinged at the end in the joint 389, at the middle supported in a rotatable manner by an axis 393 mounted on the housing, and is at the other end engaged with a pin 395 mounted on the connecting member 381.

When the engagement releasing cylinder 385 is actuated to extend or withdraw the piston rod 387, the link 391 rotates anticlockwise or clockwise about the axis 393, and the engaging members 379P, 379D connected to the connecting member 381 move in the direction X. The engaging members 379P, 379D are guided when move by the guiding members 377 disposed along each housing 339.

Figure 18:
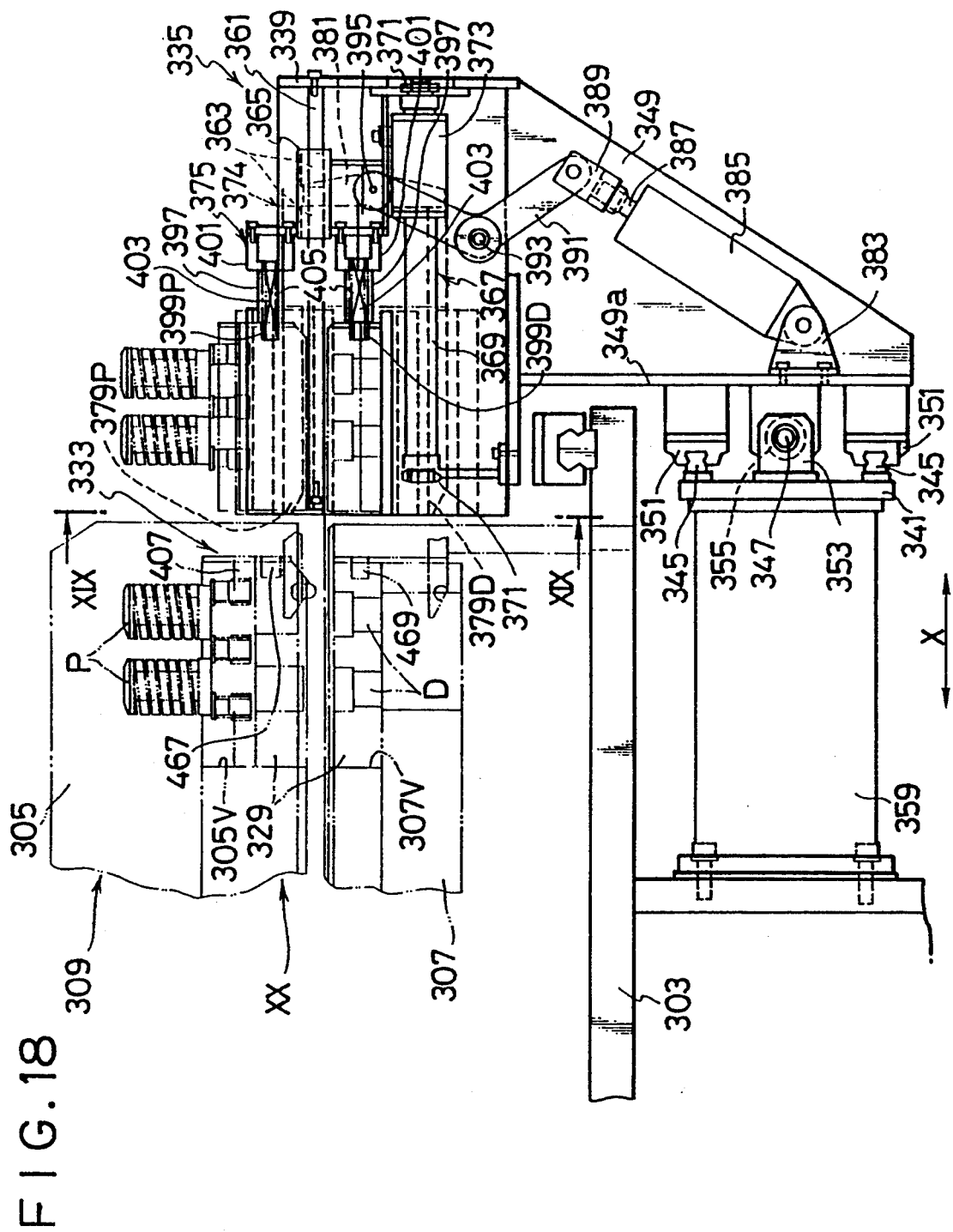
FIG. 18 is a sectional view in a large scale taken in the direction of arrow XVIII in FIG. 14.
Figure 19:
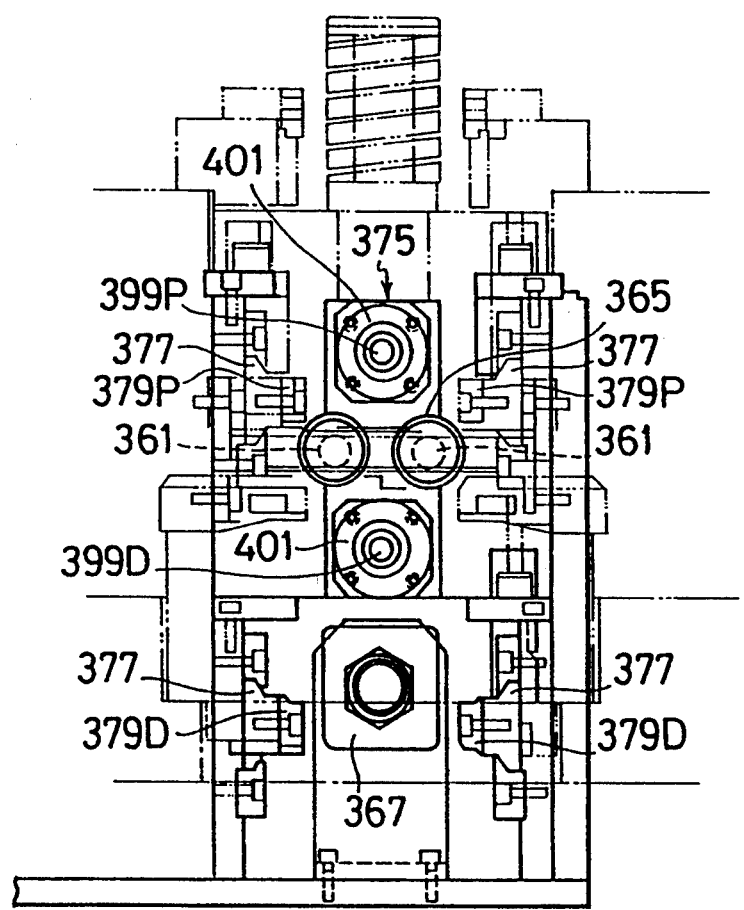
FIG. 19 is a sectional view along the line XIX—XIX in FIG. 18.

The die holding section 375 includes two holding bars 397 which are mounted on the X-axis carriage 365, and to front ends of which chuck devices 399P, 399D are attached as shown in FIGS. 18 and 19. The holding bars 397 are connected integrally to two holding cylinders 401, respectively, which are attached to the X-axis carriage 365. Piston rods 403 of the holding cylinders 401 penetrate the holding bars 397, and to ends of the piston rods 403, the chuck devices 399P, 399D are attached. The piston rods 403 are normally pressed to withdraw (to the right, in FIG. 18) by action of springs 405 disposed in the holding bars 397. The structure of the chuck devices 399P, 399D is that of a collet chuck.

When the holding cylinder 401 is actuated, the chuck devices 399P, 399D attached to the cylinder rods 403 move in the direction X.

A die set 329 is attached in the die set attaching area 333 in an exchangeable manner. As shown in detail in FIGS. 18 to 23, a U-shaped cut 5V is formed in the upper portion 305 of the turret 309 as the die attaching area 333 for attaching a die base or die holder 407 holding an appropriate number of punches P (for example, two or three as shown in FIG. 18). The die base 407 is charged from and discharged to the right side (FIG. 6).

In the die base 407 engaging members 411 with engaging portions 409 are disposed (FIG. 21, on the right and left of an upper part), while pins 413 as engaging members which engage with the engaging members 411 are disposed to slide vertically in the upper portion 305 of the turret 309. At a lower part of the each engaging pin 413 in the upper portion 305 of the turret 309, there is formed a cut 5C in which an L-shaped supporting block 415 is disposed and fixed to the upper portion 305 with bolts. A hole is formed vertically through the supporting block 415, and a threaded bar 417 is inserted in the hole. And an end of the threaded bar 417 is fixed to the engaging pin 413, and another end is fixed integrally to a supporting block 421 which supports a cam follower 419 in a rotatable manner. A spring 423 is disposed between the engaging pin 413 and the supporting block 415. The spring 423 is normally energized to press the engaging pin 413 upwards. The die base 407 and the upper portion 305 are designed so that the engaging pins 413 of the upper portion 305 of the turret 309 engage with the engaging members 411 of the die base 407 by means of the energized springs 423 when the die base 407 is charged and positioned. Therefore, positioning of the die base 407 is carried out precisely at the die attaching area 333 of the upper portion 305 of the turret 309.

Figure 20:
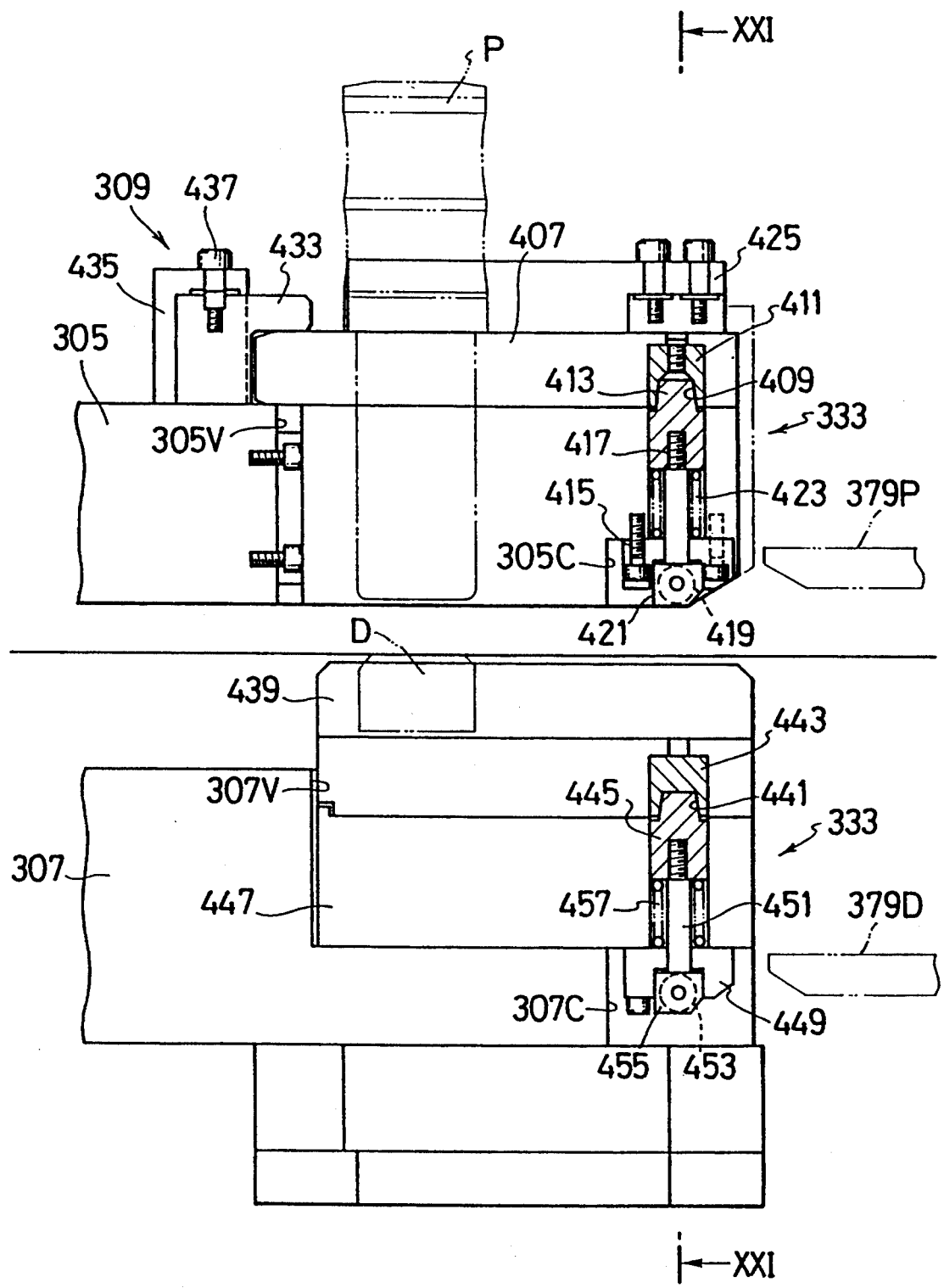
FIG. 20 is a sectional view in a large scale taken on the arrow XX in FIG. 18.
Figure 21:
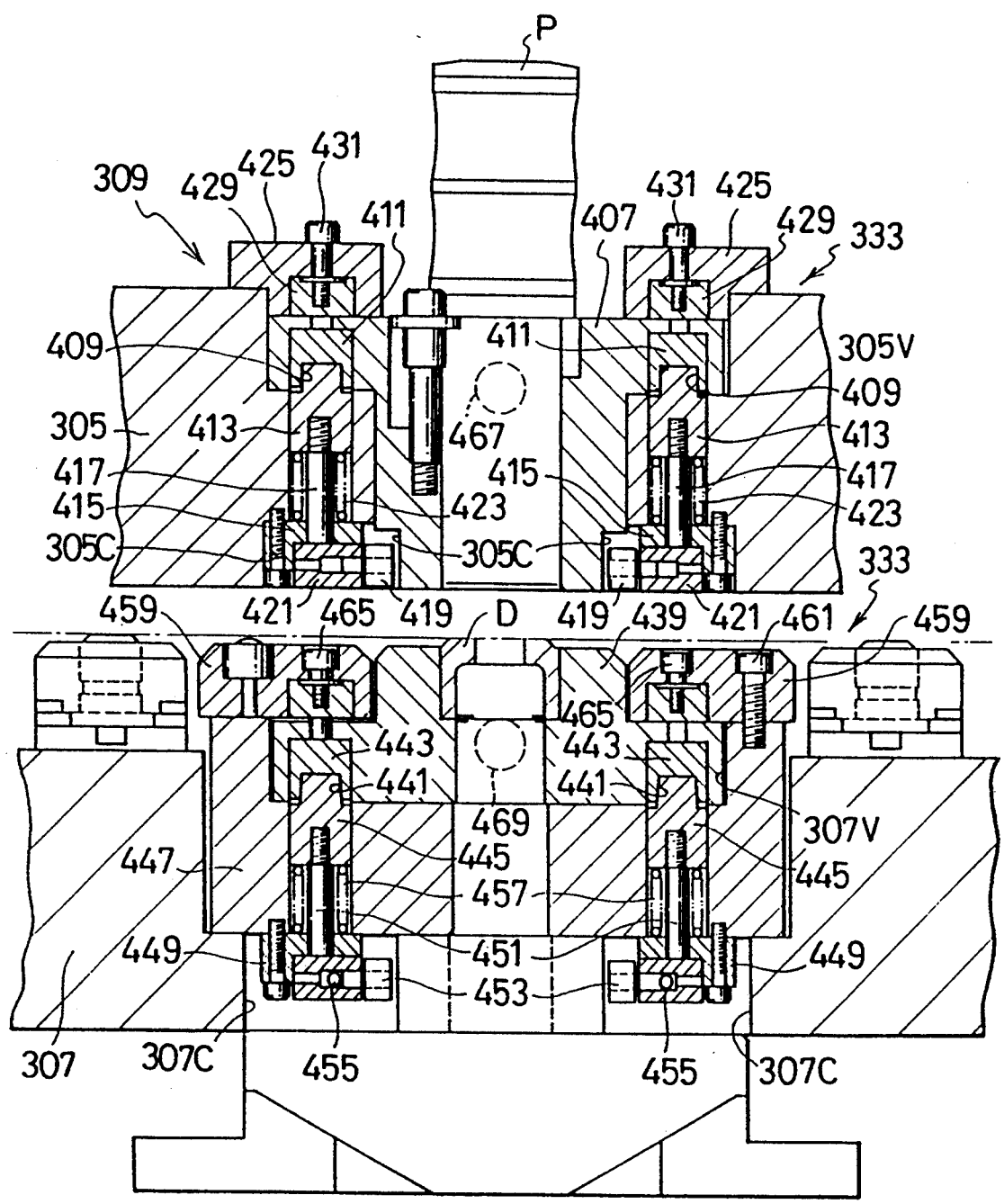
FIG. 21 is a sectional view along the line XXI—XXI in FIG. 20.
Figure 22:
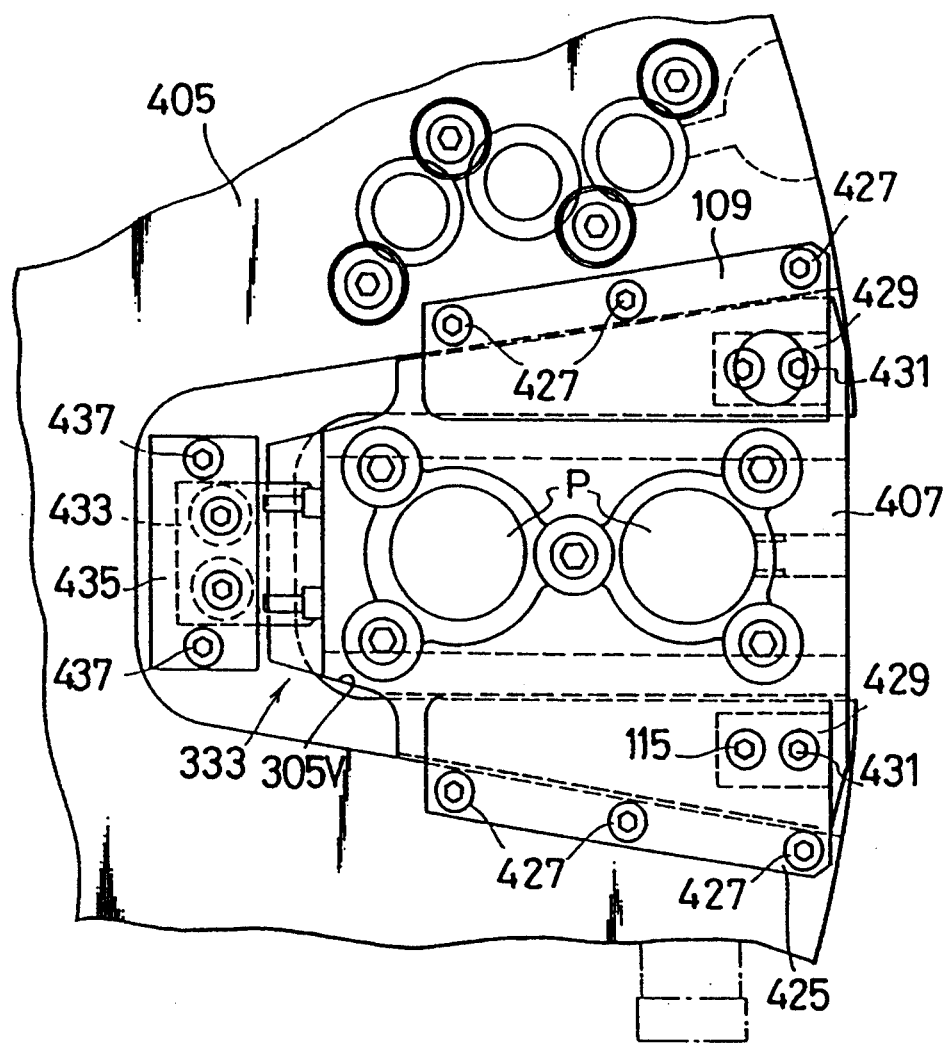
FIG. 22 is a plan of an upper part of a turret shown in FIG. 20.

As shown in FIGS. 20 to 22, a pair of holding members 425 are attached with bolts 427 to a top surface of the upper portion 305 of the turret 309 at both sides of the cut 5V for holding the die base 407 within the cut 5V. For protecting the die base 407 so as not to be damaged when it is charged in the die attaching area 333, an elastic member 429 made of gum or other material is fixed by means of bolts 431 under the each holding member 425 at an end portion of the holding member 425, which is an entrance of the die attaching area 333 for the die base 407. In addition, an L-shaped holding member 433 is attached with bolt 121 through a bracket 435 to the upper portion 305 near a front end of the cut 5V as shown in FIG. 20 and 22 for holding the die base 407 within the cut 5V.

In the lower portion 307 of the turret 309, a U-shaped cut 7V is formed as the die attaching area 333 for attaching a die base or die holder 439 holding two dies D. The die base 439 is charged from and discharged to the right side (FIG. 7).

In the die base 439 engaging members 443 with engaging portions 441 are disposed (FIG. 21 on the right and left of a lower part), while pins 445 as engaging members which engage with the engaging members 443 are disposed to slide vertically in a supporting member 447 fixed to the lower portion 307 of the turret 309. At a lower part of each engaging pin 445 in the lower portion 307 of the turret 309, there is formed a cut 7C in which an L-shaped supporting block 449 is disposed and fixed to the supporting member 447 with bolts. A hole is formed vertically through the supporting block 449, and a threaded bar 451 is inserted in the hole. An end of the threaded bar 451 is fixed to the engaging pin 445, and another end is fixed integrally to a supporting block 455 which supports a cam follower 453 in a rotatable manner. A spring 457 is disposed between the engaging pin 445 and the supporting block 449. The spring 457 is normally energized to press the engaging pin 445 upwards. The die base 439 and the lower portion 307 are so designed that the engaging pins 445 of the lower portion 307 of the turret 309 engage the engaging members 443 of the die base 439 by means of the energized springs 457 when the die base 439 is charged and positioned. Therefore, positioning of the die base 439 is carried out precisely at the die attaching area 333 of the lower portion 307 of the turret 309.

Figure 23:
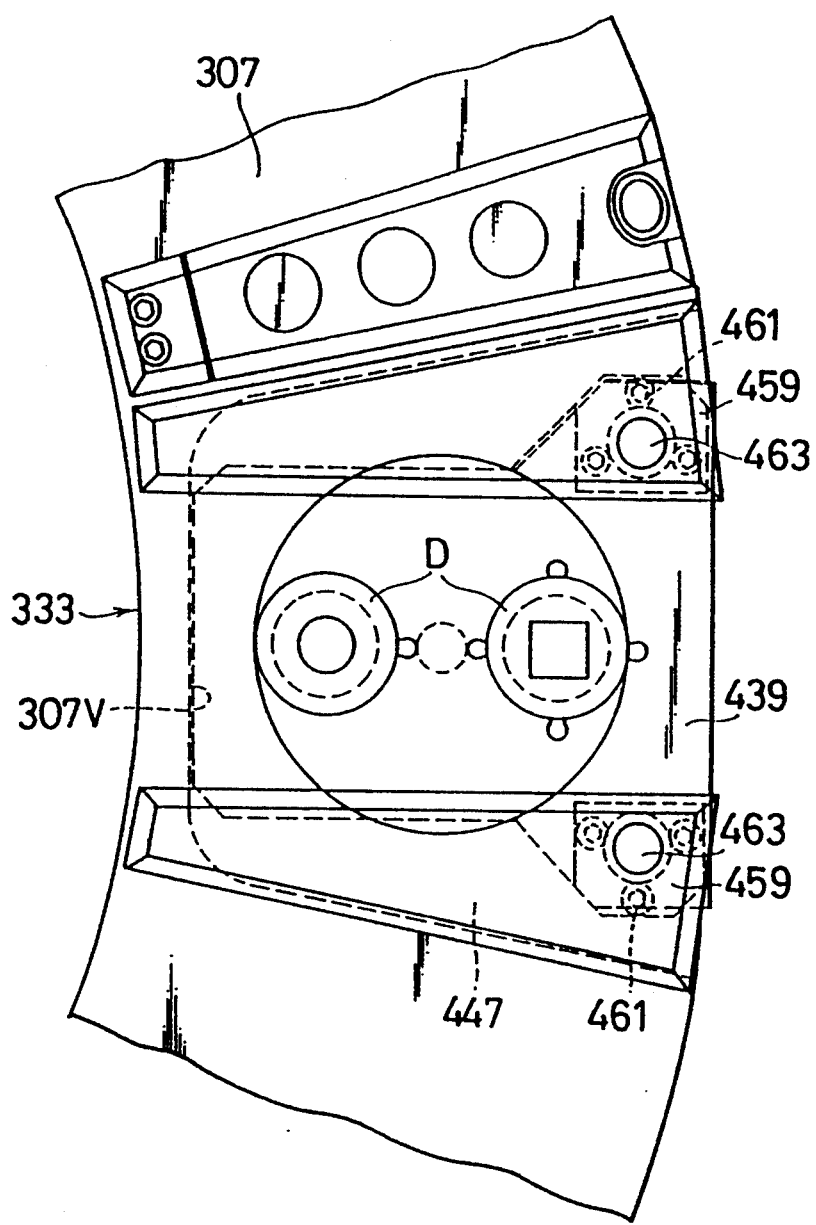
FIG. 23 is a plan of a lower part of the turret shown in FIG. 20.

As shown in FIGS. 21 and 23, a pair of holding members 459 are attached with bolts 461 to the supporting member 447 at both sides of the cut 7V for holding the die base 439 within the cut 7V. For protecting the die base 439 so as not to be damaged when it is charged in the cut 7V of the die attaching area 333, an elastic member 463 made of gum or other material is fixed by means of bolts 465 under each holding member 459 at all end portion of the holding member 459, which is an entrance of the die attaching area 333 for the die base 439.

As shown in FIG. 20, when the engaging members 379P, 379D of the engagement releasing device 374 are moved to the turret 309, inclined parts of ends of the engaging members 379P, 379D contact and press down the cam followers 419, 453, and then the engaging pins 413, 445 come down through the supporting blocks 421, 455 and the threaded bars 417, 451 against force of the springs 423, 457. Therefore, the pins 413, 445 disengage from the engaging members 411, 443, and then the die bases 407, 439 become free from the upper portion 305 and the supporting member 447 of the lower portion 307, respectively, that is, ready to be discharged from the die set attaching area 333.

Then, the chuck devices 399P, 399D are moved to the turret 309 and inserted in holes 467, 469 formed in the die bases 407, 439. When the chuck devices 399P, 399D, which are, for example, known collect chucks, are inserted in the holes 467, 469, the die bases 407, 439 are held automatically with the chuck devices 399P, 399D.

Now, an operation for exchanging die sets by means of the die exchanging device 337 is explained. The operation includes taking out the new die sets 329 from the die set storage section 331 and charging the die sets 329 into all the die set attaching areas 333 when each area 333 is at the die exchanging position 335 and discharging die sets from each area 333 at the die exchanging position 335 and storing the die sets taken out from each area 333 in the die set storage section 331.

First, all the housings 339, each of which is now empty, are moved in the direction Y until they come to a desired position in front of the die set storage section 331. Then, the rodless cylinders 367 for three housings of the four are actuated to move the X-axis carriages 365 towards the die set storage section 331, and the holding cylinders 401 are actuated for the three to move the chuck devices 399P, 399D forwards in the direction X until the chuck devices are inserted in the holding holes 467, 469 of die bases 407, 439 of three die sets 329 which are arranged in the storage section 331 at a same height of the die set attaching area 333 which is at the die exchanging position 335. By the action of the cylinders 367, 401, three housings 339 of the four hold three die sets.

Then, all the housings 339 are moved in the direction Y towards the turret 309 so that an empty housing 339 stands at the die exchanging position 335. The rodless cylinder 367 is then actuated to move the X-axis carriage 367 for the empty housing 339 until the carriage 367 comes near the turret 309. Next, the engagement releasing cylinder 385 is actuated to enable the engaging members 379P, 379D to press down the cam follower 419, 453, and therefore, a die set 329 which is engaged with the turret 309 is disengaged from it as described above. Then, the holding cylinder 401 is actuated until the chuck devices 399P, 399D come in the holes 467, 469 formed in the die bases 407, 439 to hold the die bases 407, 439, and then the die set 329 is discharged from the turret 309 by actuating the cylinder 401. The engagement releasing cylinder 385 and the rodless cylinder 367 are then actuated to withdraw the engaging members 379P, 379D and the X-axis carriage 365, respectively, away from the turret 309. The engaging pins 413, 445 are raised by action of the energized springs 423, 457 as the engaging members 379P, 379D have been withdrawn from the turret 309.

Next, housings 339 are slightly moved in the direction Y so that one of housings 339 which holds a die set 329 taken out from die set storage section 331 is located at the die exchanging position 335, and the engagement releasing cylinder 385 is actuated to press down the cam follower 419, 453, while the X-axis carriage 365 is moved forwards to charge the die set 329 into the die attaching area 333 which is at the die exchanging position 335.

Then, the holding cylinder 401 is operated to withdraw the chuck devices 399P, 399D from the holding holes 467, 469, while the engagement releasing cylinder 385 is operated to withdraw the engaging members 379P, 379D. Therefore, the engaging pins 413, 445 engage the engaging portions 409, 441 of the engaging members 411, 443 by action of the springs 423, 457, and the die set 329 is set in the die attaching area 333.

By using the the housing which has just become empty, another die set 329 in a die attaching area 333 is discharged after the die attaching area 333 has been located at the die exchanging position 335 by rotating the turret 309, and another die set 329 held in another housing will be set in the die attaching area 333 which has now become empty.

By the above operation, exchange of all die sets 329 on the turret 309 is completed. Then, three die sets 329 discharged from the turret 309 are stored in the die set storage section 331, if necessary.

When exchanging only one or two of three die sets is required, one or two housings 339 are used to take out one or two die sets from the die set storage section 331, and an empty housing is used to discharge a die set to be exchanged from the turret 309.

As described above, all the die sets 329 on the turret 309 are exchanged quickly by the die exchanging device 337 which moves only in a plane horizontally at the height of the die attaching area 333 which is at the die exchanging position 335.

The embodiment described above is not limiting, and any modifications may be applied for the embodiment within the scope of this invention.

We claim:

1. A die set exchange device adapted to be used in a punch press which includes at least one die set attaching area for detachably connecting at least one die set, and a die set storage section for storing a plurality of die sets, said die set exchange device comprising a device for carrying said die sets substantially horizontally, at a height substantially the same as the height of said attaching area, between said die set attaching area and said die set storage section, and a device for discharging said plurality of die sets substantially horizontally in a given direction, at said height, wherein said device for carrying said die sets is movable in a Y-axis direction, and said device for discharging said plurality of die sets includes a plurality of X-axis carriages, each X-axis carriage being adapted to support a respective die set, said X-axis carriages being disposed side by side in the Y-axis direction and movable independently of each other in an X-axis direction.

2. A die set exchange device adapted to be used in a punch press which includes at least one die set attaching area for detachably supporting at least one die set, and a die set storage section for storing a plurality of die sets, said die set exchange device comprising:
   a rail extending in a substantially horizontal Y-axis direction between said die set attaching area and the die set storage section;
   a housing mounted on said rail to move between said die set attaching area and said die set storage section;
   a plurality of X-axis carriages mounted on said housing in a side-by-side relationship in said Y-axis direction and movable independently of each other in a horizontal X-axis direction; and
   a plurality of tool support means each provided on a respective X-axis carriage for supporting each die set.

3. The die set exchange device of claim 2, wherein said die set attaching area is provided with a first engaging member adapted to engage with a hole formed in said die set, and said die set exchange device includes a second engaging member provided in said housing to be movable in said X-axis direction for disengaging an engagement of said first engaging member with said hole of said die set.

4. The die set exchange device of claim 2, wherein said die sets are stored in said die storage section in a line along said Y-axis direction, said die sets being movable in a vertical direction, and said housing being movable in said Y-axis direction in front of said die storage section so that each of said tool support means can be positioned in front of any of said die sets stored in said die storage section.

* * * * *

UNITED STATES PATENT AND TRADEMARK OFFICE
CERTIFICATE OF CORRECTION

PATENT NO. : 5,451,195  
DATED : September 19, 1995  
INVENTOR(S) : T. FUJIWARA et al.

Page 1 of 2

It is certified that error appears in the above-indentified patent and that said Letters Patent is hereby corrected as shown below:

On the title page, item [56], "References Cited", "FOREIGN PATENT DOCUMENTS", line 6, change "332960" to ---3322960---.

At column 1, line 58, change "arid" to ---and---.

At column 1, line 59, change "cost" to ---costs---.

At column 2, line 6, change "structure" to ---structure,---.

At column 2, line 40, after "to" insert ---be---.

At column 3, line 10, change "time" to ---the---.

At column 3, line 23, change "time" to ---the---.

At column 3, line 26, change "time" to ---the---.

At column 3, line 28, change "time" to ---the---.

At column 3, line 31, change "time" (both occurrences) to ---the---.

At column 4, line 62, change "time" to ---the---.

UNITED STATES PATENT AND TRADEMARK OFFICE
CERTIFICATE OF CORRECTION

PATENT NO. : 5,451,195
DATED : September 19, 1995
INVENTOR(S) : T. FUJIWARA et al.

It is certified that error appears in the above-indentified patent and that said Letters Patent is hereby corrected as shown below:

At column 7, line 43, change "respectively" to ---respectively;---.

At column 10, line 61, change "all" to ---an---.
At column 11, line 6, change "is" to ---is,---.

At column 11, line 46, change "All" to ---An---.
At column 16, line 8, change "all" to ---an---.

At column 16, line 22, change "respectively." to ---respectively;---.

Signed and Sealed this

Seventeenth Day of September, 1996

Attest:

BRUCE LEHMAN

Attesting Officer    Commissioner of Patents and Trademarks